(12) United States Patent
Wogsberg

(10) Patent No.: US 8,553,716 B2
(45) Date of Patent: *Oct. 8, 2013

(54) AUDIOVISUAL SIGNAL ROUTING AND DISTRIBUTION SYSTEM

(75) Inventor: Eric Wogsberg, San Leandro, CA (US)

(73) Assignee: Jupiter Systems, Hayward, CA (US)

( * ) Notice: Subject to any disclaimer, the term of this patent is extended or adjusted under 35 U.S.C. 154(b) by 1645 days.

This patent is subject to a terminal disclaimer.

(21) Appl. No.: 11/111,182

(22) Filed: Apr. 20, 2005

(65) Prior Publication Data

US 2006/0238648 A1    Oct. 26, 2006

(51) Int. Cl.
H04N 21/60       (2011.01)
(52) U.S. Cl.
USPC .............. 370/466; 709/231; 725/78; 725/80; 348/14.09; 348/14.11; 348/14.12
(58) Field of Classification Search
USPC ................. 370/466; 725/80, 78; 709/231, 709/246; 348/14.09, 14.1, 14.11, 14.12, 348/14.13, 14.14, 14.15
See application file for complete search history.

(56) References Cited

U.S. PATENT DOCUMENTS

| | | | |
|---|---|---|---|
| 5,864,554 A | 1/1999 | Rostoker et al. | |
| 6,088,360 A * | 7/2000 | Amaral et al. | 370/412 |
| 6,091,777 A * | 7/2000 | Guetz et al. | 375/240.11 |
| 6,112,250 A * | 8/2000 | Appelman | 709/247 |
| 6,169,879 B1 | 1/2001 | Perlman | |
| 6,172,605 B1 | 1/2001 | Matsumoto et al. | |
| RE37,057 E * | 2/2001 | Lee | 348/556 |
| 6,233,389 B1 * | 5/2001 | Barton et al. | 386/46 |
| 6,269,099 B1 * | 7/2001 | Borella et al. | 370/389 |
| 6,281,942 B1 | 8/2001 | Wang | |
| 6,333,750 B1 | 12/2001 | Odryna et al. | |
| 6,384,870 B1 | 5/2002 | Kempisty | |
| 6,388,700 B1 * | 5/2002 | Beyers et al. | 348/571 |
| 6,413,217 B1 * | 7/2002 | Mo | 600/440 |
| 6,792,048 B1 * | 9/2004 | Lee et al. | 375/240.26 |
| 6,796,555 B1 | 9/2004 | Blahut | |
| 6,859,845 B2 | 2/2005 | Mate | |
| 6,873,368 B1 | 3/2005 | Yu et al. | |

(Continued)

FOREIGN PATENT DOCUMENTS

| EP | 1376299 A2 | 1/2004 |
|---|---|---|
| EP | 1376299 A2 | 2/2004 |

(Continued)

OTHER PUBLICATIONS

Walker et al., Mobile Video-Streaming, Jul. 2003, BT Technology Journal, p. 192-p. 202.*

(Continued)

Primary Examiner — Hoon J Chung
(74) Attorney, Agent, or Firm — Haynes Beffel & Wolfeld LLP; Ernest J. Beffel, Jr.

(57) ABSTRACT

An audiovisual signal is converted from a native format to a digital, packetized interchange format and transported between a capture node and a display node through a switch. The display node converts the audiovisual signal from the interchange format to a displayable format and causes display of the audiovisual signal. The use of a switch for video routing and distribution allows one-to-one, one-to-many, many-to-one, and many-to-many distribution. The use of a device-independent interchange format allows concurrent distribution of multiple heterogeneous audiovisual signals.

106 Claims, 9 Drawing Sheets

(56) References Cited

U.S. PATENT DOCUMENTS

| | | | |
|---|---|---|---|
| 6,874,042 B2 | 3/2005 | Sauber | |
| 6,986,158 B1 | 1/2006 | Terui et al. | |
| 7,130,935 B2 | 10/2006 | Sauber | |
| 7,131,135 B1 | 10/2006 | Virag et al. | |
| 7,209,488 B2 * | 4/2007 | Becker et al. | 370/406 |
| 7,262,746 B2 | 8/2007 | Lagarrigue et al. | |
| 2001/0008535 A1 | 7/2001 | Lanigan | |
| 2002/0010866 A1 * | 1/2002 | McCullough et al. | 713/201 |
| 2002/0070960 A1 | 6/2002 | Maine et al. | |
| 2002/0116539 A1 | 8/2002 | Bryczkowski et al. | |
| 2002/0168934 A1 | 11/2002 | Finet | |
| 2002/0194596 A1 | 12/2002 | Srivastava | |
| 2003/0025800 A1 | 2/2003 | Hunter et al. | |
| 2003/0078045 A1 * | 4/2003 | Norstrom et al. | 455/436 |
| 2003/0128301 A1 | 7/2003 | Tarr et al. | |
| 2003/0133448 A1 | 7/2003 | Frink et al. | |
| 2003/0135631 A1 * | 7/2003 | Li et al. | 709/231 |
| 2003/0156649 A1 * | 8/2003 | Abrams, Jr. | 375/240.24 |
| 2003/0236906 A1 | 12/2003 | Klemets | |
| 2004/0114036 A1 | 6/2004 | Karaoguz et al. | |
| 2004/0128402 A1 | 7/2004 | Weaver et al. | |
| 2004/0158662 A1 | 8/2004 | Konda et al. | |
| 2004/0181617 A1 | 9/2004 | Sauber | |
| 2004/0233181 A1 | 11/2004 | Kobayashi | |
| 2004/0250276 A1 | 12/2004 | Cana et al. | |
| 2004/0257434 A1 | 12/2004 | Davis et al. | |
| 2005/0144284 A1 | 6/2005 | Ludwig et al. | |
| 2005/0165992 A1 | 7/2005 | Sauber | |
| 2005/0278462 A1 | 12/2005 | Gillespie | |
| 2006/0002681 A1 | 1/2006 | Spilo et al. | |
| 2006/0092279 A1 | 5/2006 | Thompson et al. | |
| 2007/0033289 A1 | 2/2007 | Nuyttens et al. | |

FOREIGN PATENT DOCUMENTS

| | | | |
|---|---|---|---|
| WO | | 0297584 A2 | 5/2002 |
| WO | | 02063416 A2 | 8/2002 |
| WO | | 02097584 A2 | 12/2002 |
| WO | WO-2004/056124 A1 * | | 7/2004 |
| WO | | 2004109467 A2 | 12/2004 |
| WO | | 2006113776 A3 | 10/2006 |

OTHER PUBLICATIONS

Gharai et al., RTP Payload Format for Uncompressed Video, Feb. 16, 2004, IETF, 19 pages.*
EPO, Written Opinion of the International Searching Authority for PCT application PCT/US2006/014684, Oct. 20, 2007.
EPO, International Preliminary Examination Report for PCT application PCT/US2006/014684, Oct. 23, 2007.
EPO, Written Opinion of the International Searching Authority for PCT application PCT/US2007/069316, Apr. 15, 2009.
EPO, International Preliminary Examination Report for PCT application PCT/US2007/069316, Apr. 15, 2009.
Wogsberg, commonly owned and copending U.S. Appl. No. 11/419,179, filed May 18, 2006.
Wogsberg, commonly owned and copending U.S. Appl. No. 11/111,159, filed Apr. 20, 2005.
Wogsberg, commonly owned and copending U.S. Appl. No. 11/111,158, filed Apr. 20, 2005.
John McGowan, John McGowan's AVI Overview: Audio and Video Codes, http://www.jmcgowan.com/avicodecs.html, Oct. 16, 2004.
SMARTHOME, Multi-Room S-Video Cat-5 Distribution System, Oct. 16, 2004.
VESA, VESA and Industry Standards and Guidelines for Computer Display Monitor Timing (DMT), Version 1.0, Revision 10, Oct. 29, 2004.
CYCLADES, AfterPath KVM Datasheet, Jun. 14, 2004.
IN-STAT/MDR, Gigabit Ethernet Video Routers to Make All Digital Cable TV a Reality, Jun. 30, 2003.
Tan, Liao, Campbell, Extended Abstract: Multimedia Network Subsystem Design, NOSSDAV, Apr. 24, 1996.
EPO Examination Report dated Mar. 17, 2008 in a related application, No. 06 750 674.1-1241.
PCT IPER for a related application, No. PCT/US2006/014684, Oct. 23, 2007.
PCT ISR for a related application, No. PCT/US2006/014684, Jul. 3, 2007.
Office action and Written Opinion of the Examiner mailed Jan. 31, 2012 in corresponding foreign application No. CN 200780026910.5, pp. 1-11.

* cited by examiner

AUDIOVISUAL SIGNAL ROUTING AND DISTRIBUTION SYSTEM

CROSS-REFERENCE TO RELATED APPLICATIONS

This Application is related to the following commonly-assigned and co-pending U.S. Patent Applications: (i) U.S. patent application Ser. No. 11/111,158, entitled "A Capture Node for Use in an Audiovisual Signal Routing and Distribution System" and (ii) U.S. patent application Ser. No. 11/111,159, entitled "Display Node for Use in an Audiovisual Signal Routing and Distribution System", both of which are filed on the same date as this Application and the teachings of which are incorporated herein by reference.

FIELD OF THE INVENTION

This invention relates to the field of audiovisual signal routing and distribution systems, and more specifically to a particularly efficient and flexible system for routing and distributing audiovisual signals of various differing formats.

BACKGROUND

A number of high-end video routing and distribution systems currently exist. One example is the Optima system of the AutoPatch™ division of XN Technologies, Inc. of Cheney, Wash. This configured system can handle many different types of audio and video signals.

Such video routing and distribution systems, sometimes referred to as video switches, are lagging behind the introduction of an ever increasing variety of available video formats. Conventional video switches support a number of available video formats but cannot, as a practical matter, support all video formats since the variety of video formats is growing at an increasing rate. Aside from the standard television formats, NTSC, PAL, and SECAM, video formats can be analog or digital, interlaced or progressive scan, various resolutions, various aspect ratios, various frame rates, etc. Analog formats include composite video, S-video, YUV, and RGB, for example. Digital formats include DVI, DVI+HDCP, HDMI, SDI, and HD-SDI, for example. Currently used video resolutions include 640×480, 800×600, 1024×768, 1280×1024, 1280×720, 1400×1050, 1600×1200, 1920×1080, and 2048×1536, for example. Currently used aspect ratios include 4:3, 5:4, and 16:9, for example. And currently used frame rates include 24 Hz, 25 Hz, 29.97 Hz, 30 Hz, 50 Hz, 59.94 Hz, 60 Hz, 72 Hz, and 85 Hz, for example.

Various combinations of these and other parameters of video signals can number in the hundreds, perhaps thousands, and new formats are being added with surprising frequency. Even if a video switch could feasibly support all such currently-implemented formats, the apparently inevitable introduction of a new format would immediately render such a video switch incomplete as the new format would not be supported.

Besides the impossible task of supporting all currently available video formats and any new ones that might be adopted in the future, current video switches have other disadvantages. For example, while current video switches can send one incoming video signal to multiple destinations, current video switches lack the ability to send multiple input audiovisual signals to the same output device (e.g., picture-in-picture or picture-beside-picture), to process audiovisual signals of different formats simultaneously, and to receive an audiovisual signal of one format and deliver the audiovisual signal to a display device in another format.

What is needed is a particularly efficient and flexible audiovisual signal routing and distribution system that can handle multiple input signals of various formats simultaneously and that can receive an audiovisual signal of one format and deliver the audiovisual signal to a display device in a different format so that any received signal can be displayed on any attached display device.

SUMMARY OF THE INVENTION

In accordance with the present invention, a capture node and a display node cooperate to transport an audiovisual signal in a digital, packetized interchange format. The capture node captures the audiovisual signal in its native format and converts the audiovisual signal to the interchange format. The capture node sends the audiovisual signal in the interchange format to the display node. The display node converts the audiovisual signal from the interchange format to the best displayable format for its attached display device and causes the audiovisual signal in the displayable format to be displayed. The capturing, transportation, and display of the audiovisual signal happen in real time.

The capture node and the display node cooperate to select a highest quality interchange format from a number of mutually supported interchange formats without exceeding the bandwidth available in the data connection between the capture and display nodes. To minimize excessive use of bandwidth, the interchange format generally includes no modifications to the native format that would increase the data rate of the video signal. In other words, the selected interchange format is the highest quality interchange format of the mutually supported interchange formats that does not exceed the available bandwidth allocated to the audiovisual signal. As a result, only processing that reduces the data rate of the audiovisual signal is performed by the capture node. Any necessary processing that would increase the data rate of the audiovisual data stream is performed by the display node after the audiovisual data stream has passed through the data connection and data rate is no longer a limitation.

Consider for example that the capture node captures a video signal with frames of the size 1024×768. If the targeted display device displays frames of the size 1600×1200, increasing the frame size at the capture node would increase the data rate since more pixels would be required to represent frames of the size 1600×1200. Accordingly, such frame upscaling is performed by the display node, thereby avoiding excessive data rate and excessive consumption of communications bandwidth. Conversely, if the display node displays frames of the size 640×480, the reduction in frame size would reduce the data rate and the frame downscaling is therefore performed by the capture node. Since the frame size is to be reduced with an attendant degradation of video quality regardless, having the capture node rather than the display node perform the frame size reduction reduces the data rate of the video signal as transferred from the capture node to the display node, thereby reducing consumed bandwidth without any sacrifice of video signal quality in the eventually displayed video signal.

To select the interchange format, the capture and display node exchange information regarding interchange formats supported by each. Proposals of the interchange format are exchanged, can be rejected, can be countered, and one is eventually accepted by both the capture node and the display node.

By using a digital interchange format, the audiovisual signal can be packetized and routed and distributed through a conventional digital packet switch. Switches supporting gigabit/second and higher throughput rates are becoming increasingly available and affordable. At these high data rates, a wide variety of audiovisual signals can be handled without use of lossy compression. In addition, such switches support one-to-one, one-to-many, many-to-one, and many-to-many routing models—a significant improvement over just the one-to-one and one-to-many models supported by currently available video switches.

Another significant advantage is that of heterogeneous video distribution. There is no requirement that the native format received by the capture node and the displayable format produced by the display node be the same. In fact, conversion to and from the agreed-upon interchange format makes format conversion between the source and the display quite simple and almost incidental. In addition, the heterogeneous nature of the audiovisual signals distributed in this manner applies across multiple video sources and multiple displays. In particular, a single switch can route audiovisual signals of various and different native formats to display devices requiring various and different displayable formats.

Another significant advantage is the adaptability of this system. If a new native format is created and routing and distribution of audiovisual signals of this new native format is desired, a new capture node supporting the new native format and the same negotiated interchange formats is created. No modification to any other capture nodes or any display nodes is required, since interchange formats are negotiated in the same manner, producing an interchange format accepted by pre-existing display nodes. Similarly, support for a new displayable format requires no modification to any capture node or any pre-existing display nodes, only the creation of a new display node that supports the negotiated interchange formats and the new displayable format.

Another significant advantage is the ease of installation. Since the audiovisual signal is routed as a packetized digital signal, conventional, convenient, and inexpensive copper digital cables (such as Cat5, Cat5E, and Cat6 UTP) or fiber optics can be used.

Another significant advantage is that high quality video and high quality multi-channel sound can be carried on a single cable, greatly simplifying installation.

DETAILED DESCRIPTION

Figure 1:
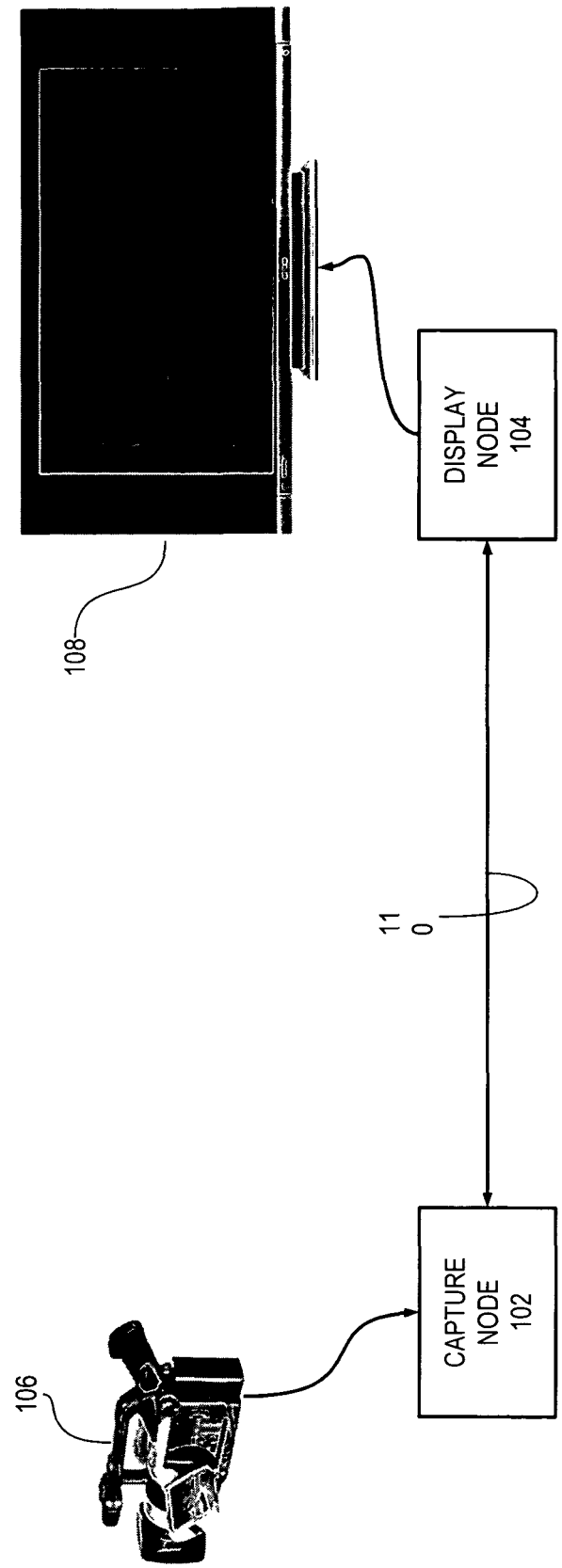
FIG. 1 is a block diagram showing a video stream distribution system in accordance with the present invention.

In accordance with the present invention, a capture node 102 (FIG. 1) and a display node 104 cooperate to transmit an audiovisual signal from a video source 106 to a display device 108 according to one or more digital audiovisual data formats, sometimes referred to herein as audiovisual interchange formats. Capture node 102 receives an audiovisual signal in a native format from source 106 and converts the audiovisual signal to a selected video interchange format for transmission to display node 104. Display node 104 receives the digital audiovisual signal in the selected video interchange format, converts the audiovisual signal to a displayable format supported by display device 108, and sends the audiovisual signal in the displayable format to display device 108.

As used herein, a "node" is any device or logic which can communicate through a network.

To facilitate appreciation and understanding of the following description, the various audiovisual signal formats referred to herein are briefly described. Video source 106 produces, and capture node 102 receives, an audiovisual signal in a "native format." The native format can be analog or digital.

Display node 104 produces, and display device 108 receives and displays, an audiovisual signal in a "displayable format." The displayable format can be analog or digital and can be the same as the native format or different from the native format. The native and display formats are external constraints and define the task to be performed by capture node 102 and display node 104. In particular, an audiovisual signal from video source 106 is to be displayed by display device 108 with as little loss of signal fidelity as possible—that is the task of capture node 102 and display node 104.

Capture node 102 sends, and display node 104 receives, the audiovisual signal in an "interchange format" through data connection 110. Interchange formats are digital. Capture node 102 and display node 104 can each support multiple interchange formats. In a manner described below, capture node 102 and display node 104 cooperate to select a particular interchange format, referred to as the "selected interchange format" by which capture node 102 and display node 104 transport the audiovisual signal through data connection 110.

As described above, capture node 102 captures the audiovisual signal from video source 106. Capture node 102 represents the captured audiovisual signal in a digital form that is an interchange format that most accurately represents the audiovisual signal in the native format. The format of the captured audiovisual signal is sometimes referred to as the "native interchange format." The native interchange format is the interchange format preferred by capture node 102.

As described above, display node 104 produces the audiovisual signal in the displayable format for display by display device 108. Display node 104 produces the audiovisual signal in the displayable format from an interchange format which most accurately represents the displayable format, and this interchange format is sometimes referred to as the "displayable interchange format." The displayable interchange format is the interchange format preferred by display node 104.

Thus, the overall audiovisual signal flow is as follows: Video source 106 produces the audiovisual signal in the native format. Capture node 102 captures the audiovisual source into the native interchange format and sends the audiovisual signal through data connection 110 in the selected interchange format, converting the audiovisual signal from the native interchange format to the selected interchange format if the two are different from one another. Display node 104 receives the audiovisual signal and converts it into the displayable interchange format if the displayable interchange format is different from the selected interchange format. Display node 104 converts the audiovisual signal from the displayable interchange format to the displayable format for playback by display device 108.

The capture, conversion, sending, receipt, conversion, and display of the audiovisual signal all happen in real time. As used herein, "real time" means that an insubstantial amount of time is required for the audiovisual signal to travel from video source 106 to display device 108 from a human user's perspective—e.g., no more than a few seconds. It is generally preferred that this amount of time is minimized, but the term "real time" is considered applicable so long as the audiovisual signal presented by display device 108 appears to be reasonably immediately responsive to a human user's control inputs into video source 106. To transport the audiovisual signal in real time, the capture, conversion, sending, receipt, conversion, and display of the audiovisual signal all happen concurrently.

It should be noted that the native format generated by video source 106 can be different from the displayable format required by display device 108. As long as there is a common interchange format supported by both capture node 102 and display node 104, any format received by capture node 102 can be displayed in any format produced by display node 104. Capture node 102 and display node 104 are coupled to one another by a data connection 110, which is described in more detail below.

Capture node 102 and display node 104 can be somewhat simple in implementation, e.g., as an appliance. For example, capture node 102 can support only a single native video format, i.e., only the native video format produced by video source 106. Similarly, display node 104 isn't required to support all known displayable formats, only the displayable format required to drive a display on display device 108. Other native and displayable formats can be implemented by other instances of capture node 102 and display node 104, respectively.

As described more completely below in conjunction with FIG. 11, data connection 110 can be routed through a switch 1102, allowing multiple capture nodes and multiple display nodes to be interconnected. An interesting system as shown includes three basic capture nodes and two display nodes. The capture nodes include one for standard definition television (SDTV) signals, one for high definition television (HDTV) signals, and one for computer-generated progressive scan RGB signals. The display nodes include one for interlaced SDTV monitors and one for fixed format, progressive scan, RGB-driven monitors. Since the interchange formats are digital and packetized, audiovisual signals can be routed through switch 1102. In a manner described more completely below, any of the three source audiovisual signals can be routed to either of the two display devices. In fact, any given source signal can be simultaneously routed to multiple display devices and any given display device can simultaneously receive and show multiple audiovisual signals.

The system implemented collectively by capture node 102 and display node 104 is therefore particularly flexible. In fact, the logic required of capture node 102 and display node 104 to implement audiovisual signal interchange in accordance with the present invention is sufficiently simple that capture node 102 can be implemented in logic embedded within a video source such as video source 106 and display node 104 can be implemented in logic embedded within a display device such as display device 108.

The selected interchange format accommodates a wide variety of audio and video signal characteristics to be handled. In particular, for the video component of the interchange format, the following characteristics are represented:
1. interlaced or progressive scan;
2. number of frames/fields per second;
3. resolution of each frame/field: number of pixels per line and number of lines per frame/field;
4. Color model: RGB, YCrCb, etc.;
5. ratio of color samples (4:4:4, 4:2:2, 4:2:0, etc.); and
6. color depth (bits per color sample).

For the audio component of the interchange format, the following characteristics are represented:
1. Number of channels: 1-8;
2. Sample rate: 32 kHz, 44.1 kHz, 48 kHz, 96 kHz;
3. Sample depth in bits per sample: 12, 16, 20, 24; and
4. Encoding: LPCM, companded, compressed:
   Compression method: MPEG1/Layer I, II, III; AC-3;
   Companding technique: A-law, µ-law.

Figure 2:
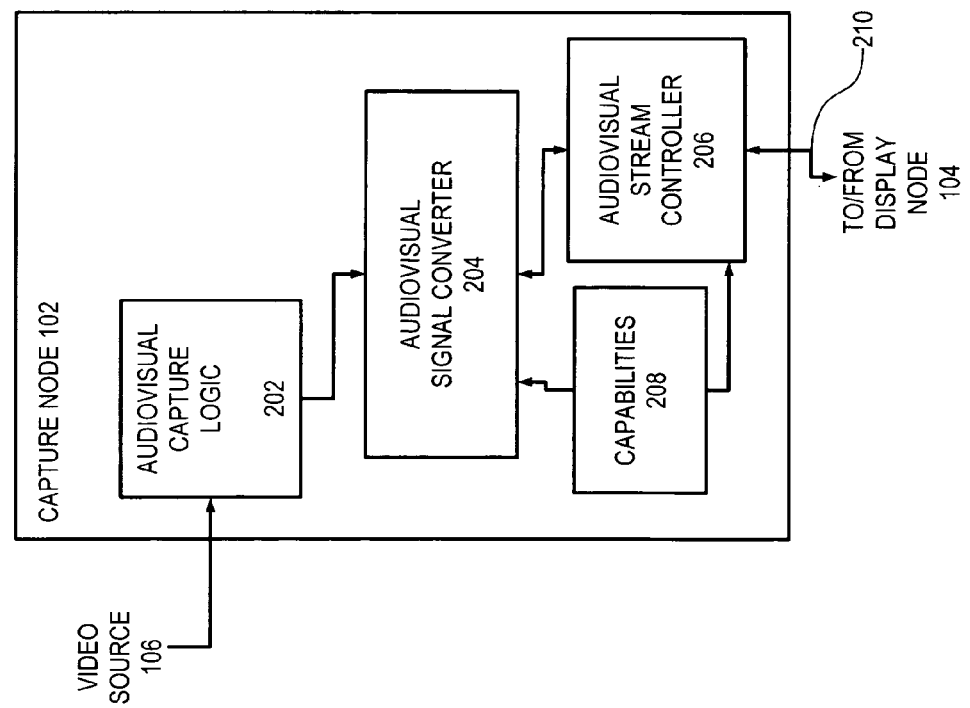
FIG. 2 is a block diagram of a capture node of FIG. 1 in greater detail.

Capture node 102 is shown in greater detail in FIG. 2. Capture node 102 includes audiovisual capture logic 202 that receives a raw audiovisual signal from an external device such as a computer, a camera, a prerecorded video player, etc. in the native format. In addition, the raw audiovisual signal captured by audiovisual capture logic 202 can be a raw video signal or a raw audio signal or a combination of video and audio. Audiovisual capture logic 202 converts the audiovisual signal from the native format to a digital representation of the native format in which pixels are organized as frames with a frame size and frame rate specific to the native format. Audio portions of the audiovisual signal are similarly captured into a series of digital samples. The video and audio portions of the captured signals are time stamped at regular intervals for synchronized playback. This digital representation of the native format is sometimes referred to herein as the native interchange format. Audiovisual capture logic generally is known and can include signal conditioning elements to capture the signal in its best possible form.

Suppose video source 106 is a standard definition video camera producing an analog YUV signal with NTSC timing characteristics. Capture node 102 recognizes this format and that there will be 59.94 fields/second, each containing 240 viewable lines. Recognition of various analog video signal formats is conventional and is not described further herein. The successive fields represent 29.97 frames/second of 480 interlaced lines. The complete, de-interlaced frame has an aspect ratio of 4:3.

The captured video signal is analog and therefore includes no specific number of pixels per line, but audiovisual capture logic 202 of capture node 102 samples the captured video signal 640 times during the display portion of each line to produce square pixels and a frame resolution of 640×480 to match the known frame aspect ratio of 4:3. The display portion of each line is that portion of the analog video signal representing luminance and/or chrominance intended to be displayed, e.g., in a video monitor capable of displaying the analog YUV signals with NTSC timing characteristics. The blanked portions of each line of the signal are considered not displayable portions of the line and are ignored.

Audiovisual capture logic 202 performs sampling using a conventional 4:2:2 method with one luminance and one color difference sample at each pixel. In this illustrative example, audiovisual capture logic 202 uses 8-bits to represent each luminance and chrominance value. The net data rate of the acquired signal in bits per second thus is the product of 640 pixels/line times 240 lines/field times 59.94 fields/second times 8 bits/sample times 2 samples/pixel–147 Mb/second. In this illustrative example, the bandwidth of data connection 110 is 1 Gb/second, of which approximately 90% is available for payload data. In this example, there are no bandwidth concerns since the data stream requires only 16% of the available payload bandwidth.

This captured digital format, namely, each second including 59.94 fields of 240 lines of 640 pixels of YUV (4:2:2) data with 8 bits per sample, is the native interchange format in this illustrative example. While capture node 102 receives an analog video YUV signal with NTSC timing characteristics, this digital format is the direct digital representation of that analog signal and is therefore the representation preferred by capture node 102.

Capture node 102 includes an audiovisual signal converter 204 that receives the captured audiovisual signal from audiovisual capture logic 202 and performs any required conversion from the native interchange format to the selected interchange format. Such conversion can require changes to various parameters of the native interchange format, including frame size (i.e., the number of pixels per line and the number of lines per frame), frame rate, color depth, and aspect ratio, for example. Audiovisual signal converter 204 can also apply data rate reduction techniques to the audiovisual signal in a manner described more completely below. If the native interchange format is also the selected interchange format, audiovisual signal converter 204 merely passes the audiovisual signal on without modification.

In one embodiment, audiovisual signal converter 204 performs scaling operations to produce frame sizes and frame rates within a continuous range. Thus, the particular video interchange formats supported by audiovisual signal converter 204 can be expressed as including ranges of characteristics. One example includes supported frame rates ranging from 1.0 to 100 frames per second. In an alternative embodiment, audiovisual signal converter 204 performs only very simple operations such as omitting every other pixel and every other scanline to reduce frame sizes by integer ratios such as 2:1, 3:1, etc. In such an alternative embodiment of audiovisual signal converter 204, supported video interchange formats are expressed as including individual, discrete values of supported characteristics. One example includes supported frame sizes of only 640×480, 320×240, and 160×120.

Capture node 102 includes an audiovisual stream controller 206 that forms a series of digital data packets representing the audiovisual signal for delivery to display node 104. As used herein, a "packet" is any collection of data to be transported together and that includes data specifying an intended destination. Details of the series of packets are described below. Audiovisual stream controller also interacts with display node 104 (FIG. 1) through data connection 110 to control the series of packets and to send the series of packets to display node 104. Capabilities 208 identify the video interchange formats that are supported by capture node 102 by storing data identifying ranges of values and/or individual discrete values of various characteristics of video interchange formats. In addition, capabilities 208 identify any higher-level signal processing capabilities of capture node 102 such as de-interlacing, for example. The cooperation between audiovisual stream controller 206 and display node 104 to agree upon a video interchange format and to effect transfer of the audiovisual signal in the video interchange format is described below.

Figure 3:
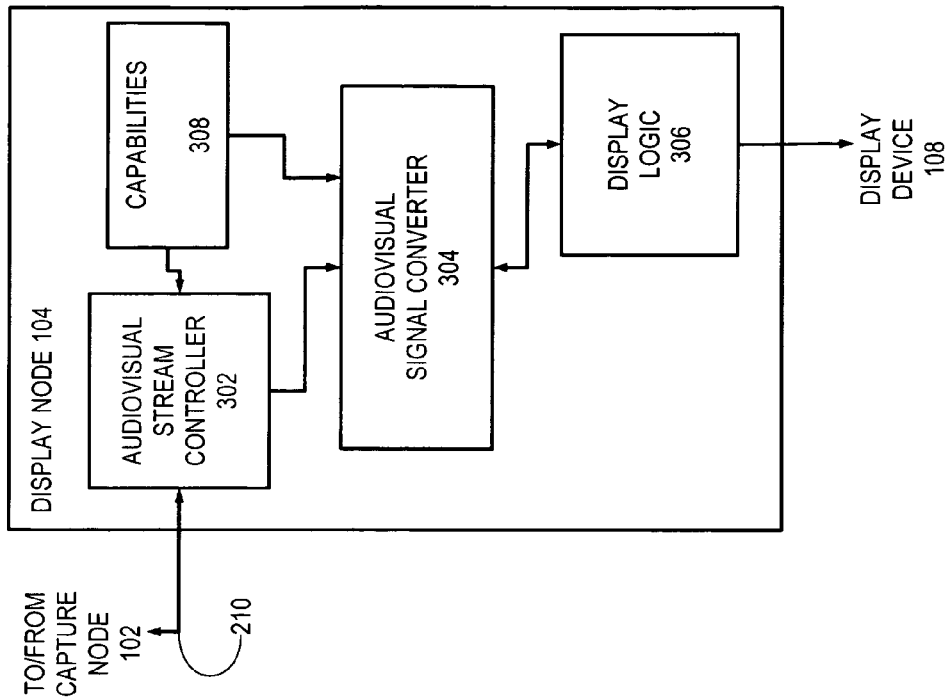
FIG. 3 is a block diagram of a display node of FIG. 1 in greater detail.

Display node 104 is shown in greater detail in FIG. 3. Display node 104 includes an audiovisual stream controller 302, an audiovisual signal converter 304, and display logic 306. Audiovisual stream controller 302 cooperates with audiovisual stream controller 206 of capture node 102 to select an interchange format and to effect receipt of the audiovisual data stream through data connection 110. Audiovisual stream controller 302 de-packetizes and sends the received audiovisual data stream to audiovisual signal converter 304, and audiovisual signal converter 304 converts the received audiovisual data stream into a form suitable for processing by display logic 306, i.e., the displayable interchange format. Such conversion can require reversal of any data rate reduction techniques applied by capture node 102 and conversion of the received audiovisual signal from the selected video interchange format to the displayable interchange format, e.g., including modification of such parameters as frame size, frame rate, color depth, and aspect ratio, for example. Audiovisual signal converter 304 can support ranges of values of various characteristics of the audiovisual data stream or can be limited to specific discrete values of such characteristics in the manner described above with respect to audiovisual signal converter 206. Such conversion is obviated if the selected interchange format is also the displayable interchange format.

Display logic 306 drives the audiovisual signal in the displayable format to display device 108 for display. Such driving can require conversion of the digital audiovisual signal in the displayable interchange format to an analog format including timing signals. The timing signals can be a re-creation of the timing signals from video source 106 and removed by audiovisual capture logic 202 or can be different timing signals, depending on the nature of the displayable video format required by display device 108. This conversion from a digital video format to an analog video format can be much like that performed by video circuitry in personal computers.

In addition, display logic 306 reconstructs an audio signal from the digitized audio portion of the audiovisual signal and synchronizes playback of the audio signal according to the timestamps included in the audiovisual signal as described above.

Display node 104 includes capabilities 308 that represent the ranges and/or discrete values of various characteristics of video interchange formats supported by audiovisual signal converter 306 and used by audiovisual stream controller 302 to negotiate which video interchange format is to be used. Capabilities 308 also represent the displayable interchange format of display node 104, namely, the interchange format preferred by display node 104 and most often the interchange format most closely approximating the displayable format required by display device 108. Capabilities 308 can be static and established during initial configuration of display node 104 or can be discovered, at least in part, from display device 108 using a conventional plug-and-play device discovery process such as the use of VESA's DDC/EDID (Display Data Channel/Extended Display Identification Data) to obtain operational limits of a display device. Display node 104 selects the best supported characteristics—i.e., video format and timing—of display device 108 that display node 104 can drive and selects a displayable interchange format according to those characteristics. In addition, capabilities 308 identify any higher-level signal processing capabilities of display node 104 such as de-interlacing, for example.

Figure 4:
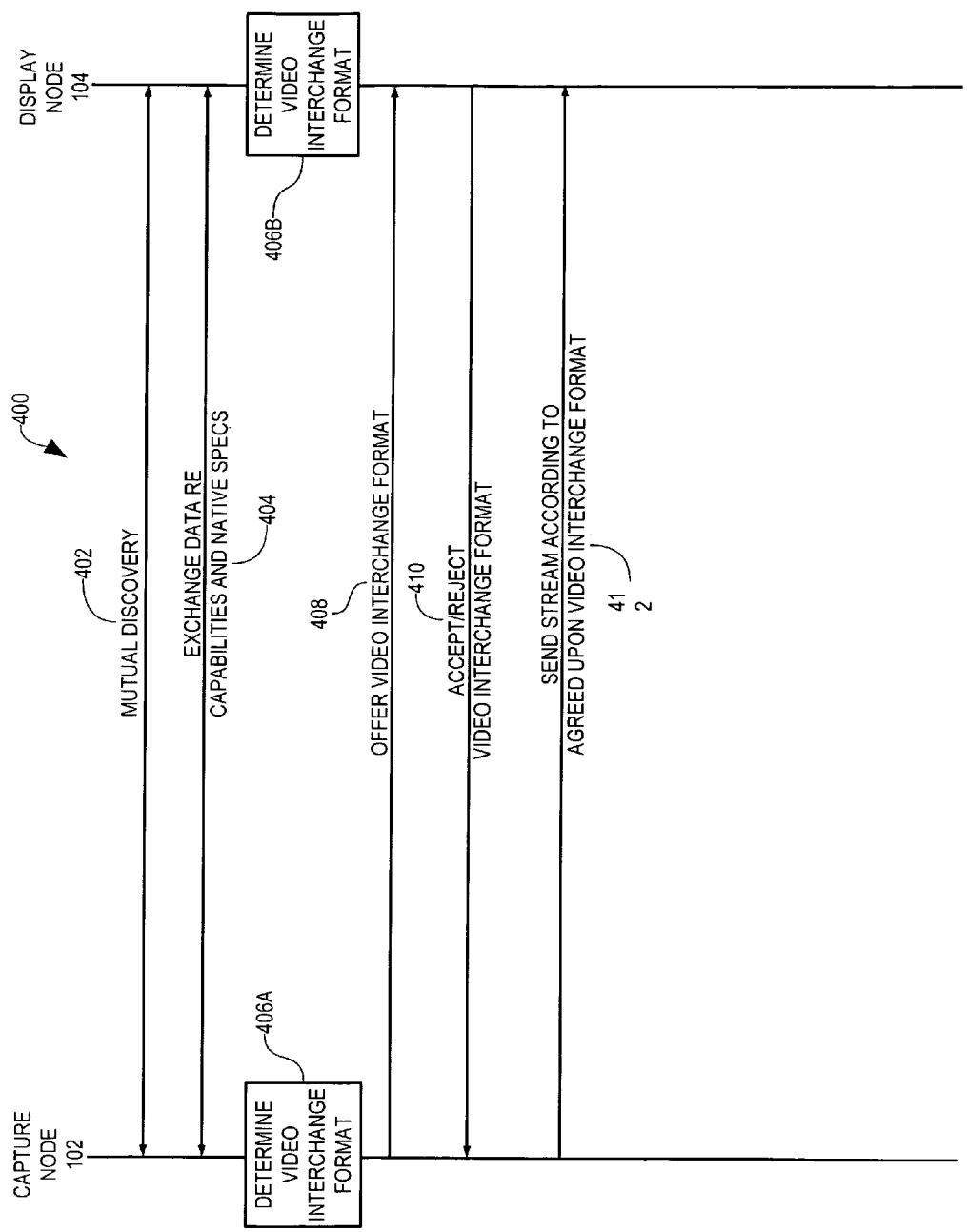
FIG. 4 is a transaction flow diagram of the transport of an audiovisual signal in an interchange format in accordance with the present invention.

The interaction between capture node 102 (FIG. 1) and display node 104 is illustrated by transaction flow diagram 400 (FIG. 4). In step 402, capture node 102 and display node 104 detect the presence of each other through data connection 110. In this illustrative embodiment, data connection 110 is a 1000BaseT connection, including CAT-5E cable and RJ45 connectors for convenience. Capture node 102 and display node 104 detect one another by both applying a signal to data connection 110 and detecting a signal from the other end of data connection 110.

In step 404, capture node 102 and display node 104 exchange information regarding the capabilities of each. For example, audiovisual stream controller 206 (FIG. 2) of capture node 102 sends data representing capabilities 208. Audiovisual stream controller 206 also sends data representing the native interchange format and data representing a firmware version and/or creation date such that capture node 102 and display node 104 can determine which, if either, has a newer negotiation protocol as implemented by each in steps 406A-B. Audiovisual stream controller 302 similarly sends data representing capabilities 308, the displayable interchange format, and data representing a firmware version and/or creation date.

In this embodiment, audiovisual stream controller 302 sends data representing the displayable interchange format. Such enables capture node 102 and display node 104 to negotiate an interchange format that preserves quality of the transmitted audiovisual signal without exceeding available bandwidth through data connection 110. The selection of an interchange format by audiovisual stream controllers 206 and 302 is described more completely below.

In steps 406A-B, capture node 102 and display node 104 independently and concurrently select a preferred interchange format according to capabilities 208 and 308, the native interchange format, and the displayable interchange format. Capture node 102 selects an interchange format preferred by capture node 102 in step 406A, and display node 104 selects an interchange format preferred by display node 104 in step 406B.

The preferred interchange format is a format that is both producible by capture node 102 and displayable by display node 104 and that is optimized to provide a desired display quality without unnecessarily consuming, or exceeding, available bandwidth of data connection 110. Briefly stated, the preferred interchange format is the interchange format that delivers the most fidelity that the source signal (as represented by the native interchange format) offers or the display device can effectively use (as represented by the displayable interchange format) without exceeding bandwidth limitations.

The primary concern in selecting the interchange format is the preservation of the quality of the audiovisual signal to the greatest extent possible. To the extent any characteristic of the audiovisual signal is modified to reduce data rate (e.g., downscaling the frame size), it is preferred that such conversion is performed by capture node 102. Such reduces the amount of data bandwidth required of data connection 110. Conversely, to the extent any characteristic of the audiovisual signal is modified to increase data rate (e.g., up-scaling the frame size), it is preferred that such conversion is performed by display node 104. Such avoids excessive consumption of bandwidth through data connection 110. However, it should be noted that, unlike most other systems, avoiding excessive consumption of bandwidth is not the primary concern. Bandwidth is generally only a concern (i) if the audiovisual signal in the selected interchange format would exceed available bandwidth or (ii) when selecting which of capture node 102 and display node 104 is to perform a particular component of digital signal processing.

Thus, as a general rule, any required down-scaling is performed by capture node 102 and any required up-scaling is performed by display node 104. One way to implement this general rule is to limit characteristics of the interchange format to the lesser of the characteristics of the native and display interchange formats. By not exceeding characteristics of the native interchange format, any modifications of the audiovisual signal that increase the data rate of the audiovisual signal are performed by display node 104 after the signal has been transported through data connection 110, thereby avoiding unnecessary use of data bandwidth through data connection 110. By not exceeding characteristics of the displayable interchange format, any modifications of the audiovisual signal that reduce the data rate of the audiovisual signal are performed by capture node 102, before the signal has been transported through data connection 110, thereby similarly avoiding unnecessary use of data bandwidth through data connection 110.

Under some circumstances, some of which are described below, the interchange format selected in the manner described above is estimated to exceed the available bandwidth of data connection 110, thereby likely to result in failure to successfully deliver the audiovisual signal through data connection 110. If the preferred interchange format is estimated to exceed available bandwidth of data connection 110, the preferred interchange format is modified by application of data rate reduction techniques that are described in greater detail below. In this illustrative embodiment, the available bandwidth of data connection 110 for data payload is a predetermined proportion (e.g., 90%) of the total available bandwidth of data connection 110. For example, if data connection 110 is established at 1 gigabit per second, the available bandwidth of connection 110 to capture node 102 and display node 104 is 900 megabits per second.

In the example given above, the native interchange format represents a YUV signal with NTSC timing characteristics and includes 59.94 fields of 240 lines of 640 pixels of YUV (4:2:2) data with 8 bits per sample. If display device 108 is a standard definition television monitor and accepts an interlaced, YUV signal, then the displayable interchange format is identical to the native interchange format and, thus, also the selected interchange format. No additional signal processing would enhance the fidelity of the audiovisual signal transported through capture node 102 and display node 104.

If display device 108 is a progressive-scan computer monitor with XGA native resolution (1024×768), then the displayable interchange format—the format preferred by display node 104—is the format most accurately resembling the native display characteristics of an XGA computer monitor: 60 frames per second, each having 768 lines of 1,024 pixels in 24-bit RGB representation. The audiovisual signal will have to be converted to match the monitor's characteristics by either capture node 102 or display node 104; the data stream has to be converted (i) from an interlaced signal to a progressive scan signal, (ii) from YUV to RGB, and (iii) upscaled in frame size from 640×480 to 1024×768. From a signal fidelity perspective, either capture node 102 or display node 104 can be configured to perform such conversions. From a conservation of bandwidth perspective, it would make sense to do all these conversions at the destination, i.e., within display node 104. In particular, the upscaling should be done by display node 104 and not capture node 102 since there is no advantage to doing the upscaling in capture node 102.

De-interlacing and color-space conversion can be performed by either capture node 102 or display node 104. In one embodiment, interchange formats are all progressive scan and RGB since (i) most display devices (and all digital displays: LCD, plasma, LCoS, DLP) are natively progressive scan and RGB and (ii) many types of format conversion—frame size scaling and frame rate conversion in particular—are best performed on progressive scan video data. In an alternative embodiment, interlaced interchange formats are supported since de-interlacing can be a fairly complex operation, involving motion detection and compensation in many implementations. In addition, de-interlacing by capture node 102 can double the amount of bandwidth of data connection 110 consumed by the audiovisual signal with no particular benefit relative to performing de-interlacing within display node 104 or foregoing de-interlacing altogether if display device 108 displays an interlaced signal.

De-interlacing doubles the data rate (going from 29.97 to 59.94 frames/second) and using 24-bit RGB increases the data rate by another 50%, so the resulting data rate in this illustrative example is now 442 Mb/second, still well within available bandwidth. In addition, the complexity of de-interlacing and the significance of the effect on overall signal quality is believed to be sufficient justification for increasing the data rate within capture node 102 if capture node 102 incorporates a superior implementation of de-interlacing relative to that of display node 104.

It should be appreciated that de-interlacing sometimes results in a reduction in data rate: if the video content originated as film and is natively 24 frames/second, the de-interlacing process should detect that situation and the output will be 24 unique frames/second. As an interlaced video signal, each frame would be different from the preceding one (since each represents a different field, either odd or even) and would generally not be detected by simple redundancy avoidance techniques. However, de-interlacing the frames would make their redundancy apparent. Since there is no need to transmit identical frames, the 36 redundant frames/second generated may be dropped. This happens automatically by application of redundancy elimination as implemented by capture node 102, as described more completely below.

Figure 5:
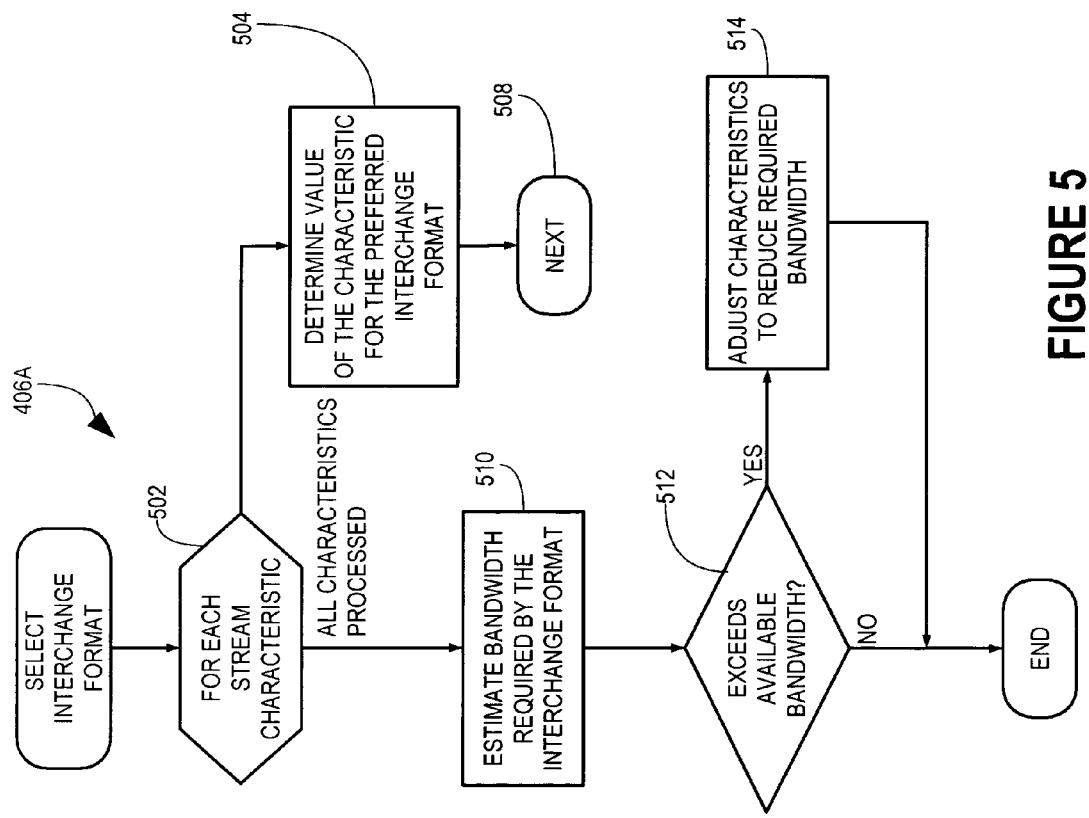
FIG. 5 is a logic flow diagram of the selection of an interchange format in accordance with the present invention.

Returning to FIG. 4, step 406B is analogous to step 406A and the following description of step 406A is equally applicable to step 406B as performed by display node 104. Step 406A is shown in greater detail in logic flow diagram 406A (FIG. 5). Loop step 502 and next step 508 define a loop in which each of a number of various characteristics specified in capabilities 208 and 308 are processed according to step 504. Such characteristics include those listed above with respect to video and audio components of the interchange format. For each such characteristic, processing transfers from loop step 502 to step 504.

In step 504, capture node 102 determines the value of the subject characteristic for the preferred interchange format. As described briefly above, the preferred interchange format is the interchange format that delivers the most fidelity that the native interchange format offers or the displayable interchange format can effectively use without exceeding bandwidth limitations. In this illustrative embodiment, bandwidth considerations are deferred until steps 512-514, which are described below. Thus, the immediate concern in step 504 is the particular value of the characteristic that delivers the most fidelity that the native interchange format offers or the displayable interchange format can effectively use.

This determination depends largely on the nature of the characteristic under consideration. Some characteristics are fairly straight forward. For example, frame or field size represents a number of scanlines and a number of pixels per scanline. The greatest fidelity of the native interchange format is a frame or field size of exactly the same dimensions. If the displayable interchange format is capable of including each and every pixel of each frame or field of this size, the dimensions of the native interchange format are used for the preferred interchange format. Conversely, if the displayable interchange format cannot display all pixels of frames or fields of that size, the frame or field size of the preferred interchange format is one that does not include pixels which cannot be represented in the displayable interchange format. Specifically, if the frame size of the displayable interchange format is smaller than the frame size of the native interchange format, the preferred interchange format uses the frame size of the displayable interchange format. Other straight forward characteristics include such things as frame rates and color depth.

Other characteristics are not so straight forward. For example, the color model can be RGB or YCrCb, among others. If the native interchange format represents colors using the YCrCb model and the displayable interchange format represents colors using the RGB color model, the audiovisual signal undergoes color model conversion. However, it's less clear whether such color model conversion is best performed by capture node 102 or display node 104. This issue can be resolved in any of a number of ways. For example, capabilities 208 and 308 can indicate that only display node 104 is capable of such color model conversion. In this case, the preferred interchange format represents pixels in the YCrCb color model since capture node 102 is not capable of converting the color model to RGB. One feature that tends to require significant processing is de-interlacing. For cost reduction, it is useful to implement de-interlacing in only one of capture node 102 and display node 104. Whether the preferred interchange format includes interlaced or progressive scan video depends upon the native interchange format, the displayable interchange format, and which of node 102-104 can perform de-interlacing.

These same principles of preserving the most fidelity of the native interchange format to the extent the displayable interchange format can effectively use that fidelity are applied across each characteristic of the preferred interchange format in the loop of steps 502-508.

When all characteristics have been processed according to the loop of steps 502-508, processing according to the loop of steps 502-508 completes. At this point, capture node 102 has determined a preferred interchange format such that each selected characteristic is an optimum selection for preservation of audiovisual signal quality without unnecessary use of bandwidth through data connection 110 to represent data that can't be effectively used by display node 104.

After the loop of steps 502-508, processing according to logic flow diagram 406A transfers to step 510. In step 510, capture node 102 estimates the data rate associated with the selected interchange format selected according to the loop of steps 502-508. Data rate estimation can be as simple as the product of (i) the frame rate (frames per second), (ii) the resolution (pixels per frame), and (iii) the pixel depth (bits per pixel)—plus any data overhead such as time-stamps, frame-start, and scanline-start markers and packet data overhead. The result is an estimated data rate in bits per second.

In test step 512, capture node 102 determines whether the estimated data rate exceeds the available bandwidth through data connection 110. In this illustrative embodiment, data connection 110 is a 1000BaseT connection and can support up to one gigabit per second data throughput. However, actual available bandwidth through data connection 110 can be a bit less than one gigabit per second.

In addition, the available bandwidth between capture node 102 and display node 104 can be even less if display node 104 receives audiovisual data streams from multiple capture nodes in an alternative embodiment described more completely below. In such cases, display node 104 allocates a data rate to capture node 102 and reports that allocated data rate to capture node 102.

If the estimated data rate of the selected interchange format exceeds the available throughput of data connection 110, processing transfers to step 514. In step 514, capture node 102 adjusts the constituent characteristics of the selected interchange format. In one embodiment, capture node 102 reduces the frame rate of the video interchange format by one-half to reduce the estimated data rate of the video interchange format. Of course, much more complex mechanisms can be used to reduce the data rate of the video interchange format. In an alternative embodiment, data rate reduction is accomplished according to a predetermined default policy that can be specified according to the particular preferences of a given implementation. For example, image clarity may be paramount for a particular implementation and the default policy can prefer frame rate reduction over resolution reduction and lossy compression. In another implementation, smoothness of motion video may be paramount and the default policy can prefer resolution reduction and/or lossy compression over frame rate reduction. Other data rate reduction techniques can use lossless compression (e.g., run-length encoding) and frame-to-frame redundancy avoidance to reduce the data rate of the video interchange format without reducing quality of the transmitted audiovisual signal and without requiring particularly sophisticated logic in either capture node 102 or display node 104. These data rate reduction techniques are described more completely below.

If, in test step 512, capture node 102 determines that the estimated bit-rate does not exceed the available bandwidth of switch 104, step 514 is skipped since bit-rate reduction is unnecessary. After steps 512-514, processing according to logic flow diagram 406A, and therefore step 406A (FIG. 4) completes.

After steps 406A-B, both capture node 102 and display node 104 have independently arrived at a preferred interchange format. In steps 408-410, capture node 102 and display node 104 negotiate to arrive at a consensus regarding the selected interchange format. While many different negotiation techniques can be used to reach such a consensus, this particular mechanism suffices. In step 408, capture node 104 sends a proposed interchange format to display node 104. In step 410, display node 104 responds with either acceptance of the offered interchange format or rejection and a counter-offered interchange format if the offered interchange format is rejected. Display node 104 only rejects the proposed interchange format if (i) the proposed interchange format is different from the one selected by display node 104 in step 406B and (ii) the firmware versions and/or creation dates of nodes 102-104 indicate that display node 104 is a newer version than capture node 102 and therefore implements a newer, and therefore presumably preferable, version of interchange format selection. In an embodiment described more completely below, display node 104 implements a graphical user interface using an on-screen display of display device 108 by which a user can specify preferences for data rate reduction. Such preferences can include, for example, preserving image clarity and color depth, perhaps at the expense of loss of smooth motion; preserving motion smoothness and color depth, perhaps at the expense of image clarity; and preserving image clarity and motion smoothness, perhaps at the expense of color depth. In such embodiments, it is preferred that display node 104 have ultimate authority over the selected interchange format to effect the user's preferences.

In this illustrative embodiment, capture node 102 immediately responds by starting to send the audiovisual signal in step 412 according to the proposed interchange format if display node 104 accepted it in step 410 or according to the counter-offered interchange format if display node 104 responded in step 410 with a rejection. In an alternative embodiment, capture node 102 confirms successful receipt of, and agreement with, the counter-offered interchange format prior to step 412.

In step 412, capture node 102 sends data packets representing the audiovisual signal in the selected interchange format. The data packets are formed by audiovisual stream controller 206. Despite all the variations of interchange formats that can be supported by capture node 102 and display node 104, the variations have a number of characteristics in common. Each is essentially a series of frames or fields, each of which includes an array of pixels. Typically, the video signal received by capture node 102 contains horizontal and vertical blanking periods and has timing appropriate for the originally-intended display device. For example, an NTSC tuner would emit its video signal with appropriate pixel rate and horizontal and vertical blanking periods to drive a standard NTSC monitor. In the context of the audiovisual interchange system described herein, this native timing is largely irrelevant since the video content, i.e., the pixels themselves, can be displayed on a display device with completely different timing characteristics. Accordingly, the timing characteristics required by display device 108 are generated by display node 104. The interchange formats used in the interchange system described herein contain only pixels and end-of-line and end-of-frame/end-of-field markers. Since blanking periods of the video signal are omitted, the data rate required to represent the video signal is significantly reduced.

Figure 6:
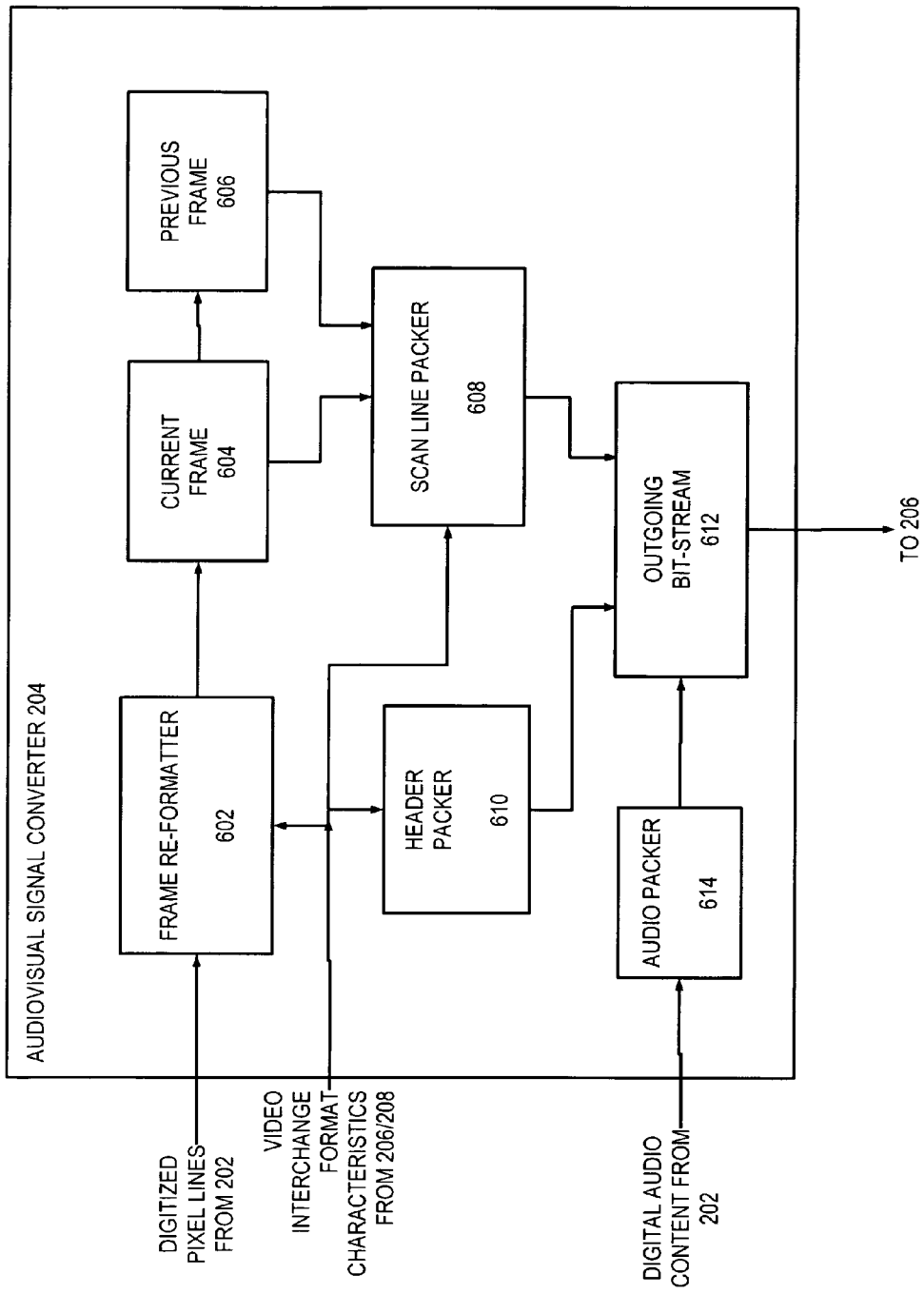
FIG. 6 is a block diagram of the audiovisual signal converter of FIG. 2 in greater detail.

Audiovisual signal converter 204 (FIG. 2) of capture node 102 is shown in greater detail in FIG. 6. Audiovisual signal converter 204 includes a frame re-formatter 602 that receives digitized pixel lines from audiovisual capture logic 202. Audiovisual capture logic 202 captures a video signal and immediately converts the captured signal to a digital format, namely, the native format in the manner described above. As described above, audiovisual capture logic 202 captures an analog video signal with NTSC timing characteristics into a native interchange format which includes 59.94 fields of 240 lines of 640 pixels for each second of the video portion of the audiovisual signal. Of course, in other embodiments, capture node 102 can capture video according to other formats with other characteristics.

Frame re-formatter 602 re-formats the digitized pixel lines according to characteristics of the selected interchange format. Such re-formatting can include, for example, de-interlacing, frame size reduction by cropping and/or downscaling, color depth reduction, frame rate reduction, etc. Cropping can be used to remove a predetermined border of a few scanlines at the top and bottom and a few columns of pixels at either edge to remove noise, overscan, or any anomalies at the edges of the video image and to reduce slightly yet appreciably the amount of data required to represent the video signal. Cropping can also be used in conjunction with automatic letterbox detection to remove, thereby avoiding representation of, blank portions of the video signal. As described above, processing that reduces data rate is typically performed by capture node 102 while processing that increases data rate is typically performed by display node 104. In this illustrative embodiment, de-interlacing is performed by capture node 102 despite the increase of data rate as a result of such de-interlacing. The result of processing by frame re-formatter 602 is a current frame 604 that comports with the agreed-upon video interchange format.

Some processing performed by frame re-formatter 602 requires knowledge of the contents of a prior frame. Such processing can include for example frame-to-frame redundancy removal and/or frame rate upscaling including interpolated frames. Upon completion of a new current frame 604, the prior contents of current frame 604 are stored as previous frame 606. In an alternative embodiment, individual scan lines are moved from current frame 604 to previous frame 606 upon completion to minimize latency since scan line packer 608, which is described more completely below, processes individual scan lines.

Audiovisual signal converter 204 includes scan line packer 608. Scan line packer 608 forms data packets representing current frame 604 and sends such packets for inclusion in an outgoing bit-stream 612. While data rate reduction by reducing characteristics of the video interchange format, such as reducing frame rate, frame size, or color depth, is performed by frame re-formatter 602, scan line packer 608 implements other data rate reduction and redundancy removal techniques in forming the data packets. These techniques are described more completely below.

Audiovisual signal converter 204 also includes a header packer 610 that forms data packets representing header information and includes those packets in outgoing bit-stream 612. In addition, audiovisual signal converter 204 includes an audio packer 614 that forms audio frames for inclusion of audio content in outgoing bit-stream 612. Audiovisual signal converter 204 sends outgoing bit-stream 612 to audiovisual stream controller 206, which implements a data transfer protocol with audiovisual stream controller 302 (FIG. 3) of display node 104 by which the data packets of outgoing bit-stream 612 (FIG. 6) are communicated to display node 104.

Figure 7:
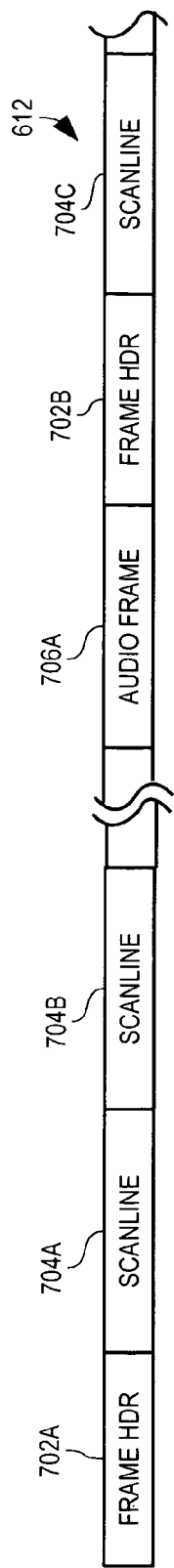
FIG. 7 is a block diagram of an outgoing bit-stream of FIG. 6 in greater detail.

Outgoing bit-stream 612 is shown in greater detail in FIG. 7 and includes a frame header 702A, a number of scan line packets 704A-B, an audio frame packet 706A, another frame header 702B, and a number of scan line packets 704C corresponding to frame header 702B. Particularly, each frame is represented by a frame header (e.g., frame header 702A) followed by a number of scan line packets (e.g., scan line packets 704A-B) that correspond to the frame header.

Audio frame packets (e.g., audio frame packet 706A) are included in outgoing bit-stream 612 but don't necessarily correspond to the current frame. There are a few aspects of audio signals that require processing different from the processing of video signals. For example, while frames of a video signal can be added or dropped, playback of the audio portion of the audiovisual signal is preferably unbroken. Audio and video frames are therefore independently time-stamped. Processing of video portions of the audiovisual signal is often significantly more complex and/or requires significantly greater resources than processing of the audio portions of the same audiovisual signal. In addition, people naturally compensate for audio delayed relative to corresponding visual subject matter due to the relative speeds of sound and light. However, visual subject matter delayed relative to corresponding audio is rather unnerving for a human viewer/listener. Accordingly, a delay is generally required in the audio portion of the audiovisual signal to avoid early playback of the audio portion relative to the video portion.

Figure 8:
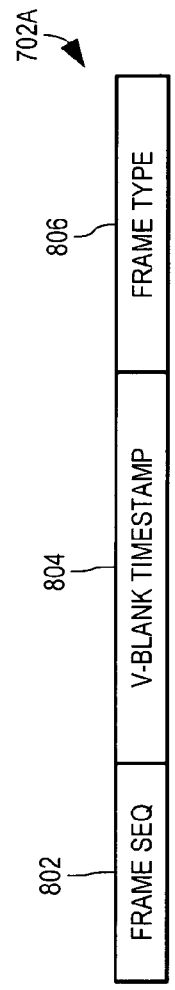
FIG. 8 is a block diagram of a frame header packet of FIG. 7 in greater detail.

Frame header 702A is shown in greater detail in FIG. 8 and represents a particular frame of the audiovisual signal in the agreed-upon video interchange format. The particular frame is sometimes referred to as the subject frame in the context of FIGS. 8-9. Frame sequence field 802 represents a sequential number of the subject frame and assists display node 104 in the sequencing of frames and in associating subsequent scan line packets with the proper frame. Vertical-blank time stamp 804 represents a date and time at which the subject frame was captured and can assist with (i) proper timing of the presentation of the subject frame by display node 104, (ii) proper frame rate conversion by accurately reporting time intervals between frames, and (iii) synchronization of audio with the playback of the subject frame. Vertical-blank time stamp 804 can also be used to synchronize playback of multiple audiovisual signals captured simultaneously, particularly if the captured audiovisual signals are captured and stored for later playback. Such storage of captured audiovisual signals is described more completely below.

Frame type field 806 identifies the type of the subject frame: normal, compressed, or dropped. A dropped frame is represented by only a header which identifies the frame and indicates that the frame contents are not sent. The compression indicated in frame type field 806 can indicate a type of compression including, for example, run-length encoding, redundancy elimination, etc. A normal frame is one which is (i) present (not dropped) and (ii) not compressed.

Figure 9:
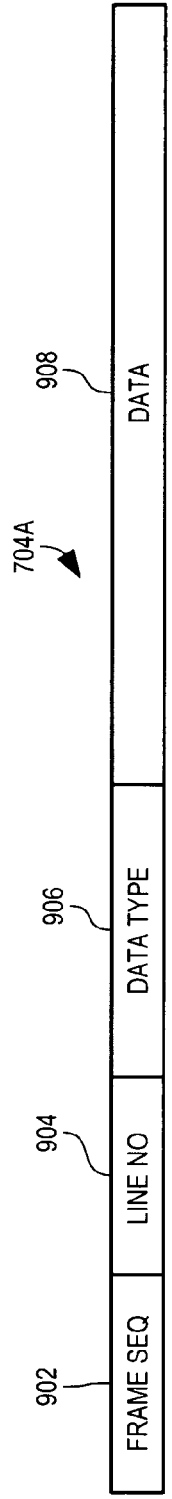
FIG. 9 is a block diagram of a scan line packet of FIG. 7 in greater detail.

Scan line 704A is shown in greater detail in FIG. 9 and represents a particular line of pixels of the subject, i.e., the subject scan line. Frame sequence field 902 identifies the frame to which scan line 704A belongs according to the frame's sequence number as represented in frame sequence field 802 (FIG. 8). Line number field 904 (FIG. 9) represents a sequence number of the subject scan line and specifies the relative position of the subject scan line within the subject frame. Data type field 906 specifies one of a number of formats of the pixel data as represented in data field 908. If data type field 906 indicates that the pixel data is "raw," data field 908 stores an entire scan line of pixels represented in the format specified in the selected interchange format, e.g., 24-bit color. If data type field 906 indicates a type of compression, such as run length encoding, data field 908 stores an entire scan line of pixels represented in the indicated compressed format. If data type field 906 indicates that the subject scan line has no change from the same scan line in the previous frame, data field 908 specifies a number of scan lines for which there is no change relative to the previous frame. Compression, e.g., run length encoding, and avoiding sending scan lines that are unchanged from the previous frame avoid redundancy and reduce the data rate of the audiovisual signal in the agreed-upon video interchange format.

Audio frame packet 706A includes a time stamp for proper correlating to the subject frame and the audio data itself. If audio frame packet 706A corresponds to a particular frame of the audiovisual signal, audio frame packet 706A can include a frame sequence number in addition to, or instead of, the timestamp.

Audiovisual signal converter 204 sends outgoing bit-stream 612 to audiovisual stream controller 206 for transport to display node 104 through data connection 110. Audiovisual stream controller 206 transports outgoing bit-stream 612 by: (i) forming packets of a preferred size from bit-stream 612, (ii) applying headers to the packets to include any required addressing information to direct delivery of the packets to display node 104, (iii) appending cyclical redundancy checks (CRCs) to the packets so that display node 104 can assess the accuracy and completeness of each packet, and (iv) metering the packets out at a pace which can be properly handled by display node 104 and any intermediate network devices such as a switch 1102 (FIG. 11).

Figure 11:
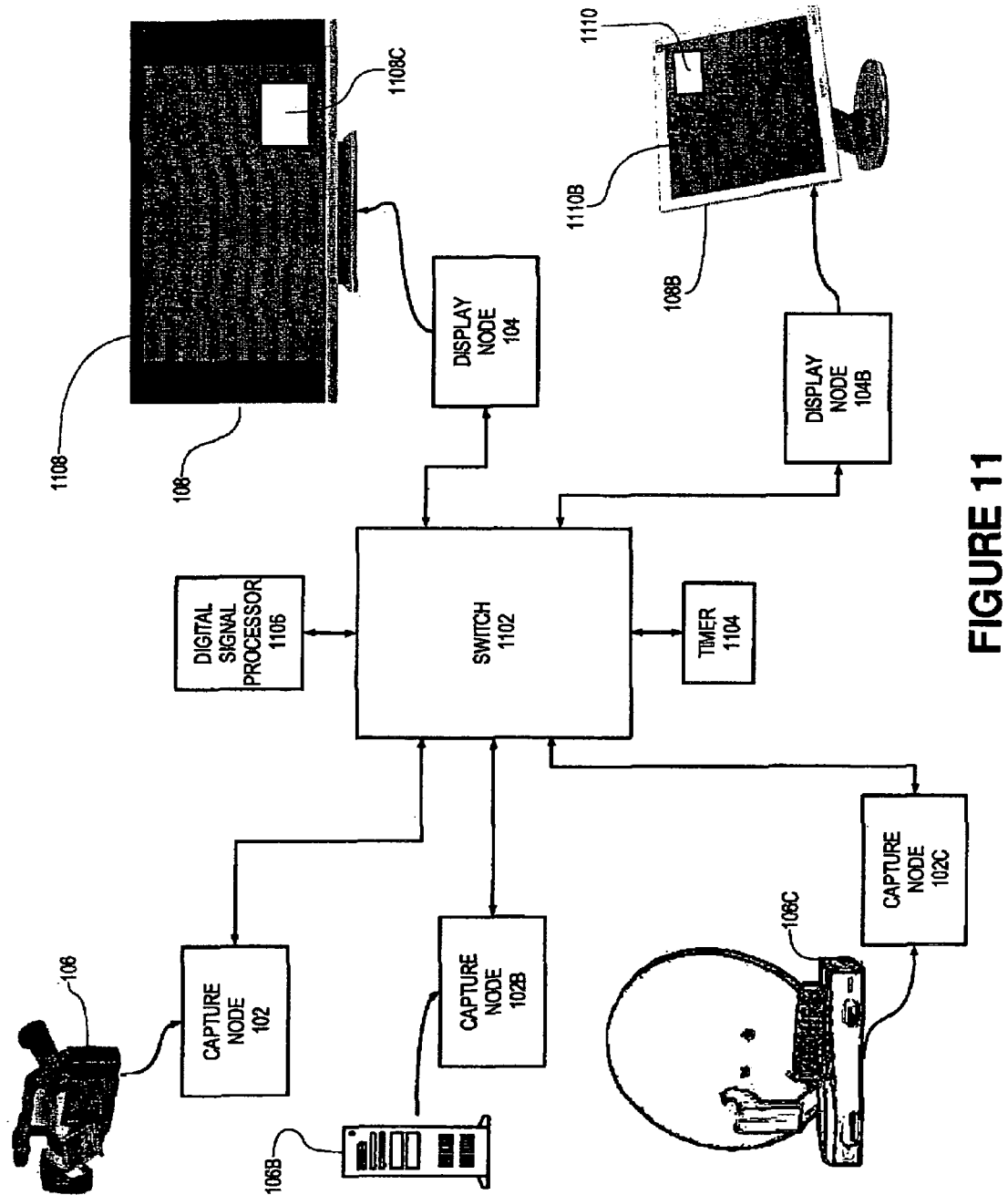
FIG. 11 is a block diagram showing a video stream distribution system involving multiple capture nodes and multiple display nodes and a switch in accordance with the present invention.

In this illustrative embodiment, audiovisual stream controller 206 forms packets of a preferred size which is equal to one-half of the capacity of a bit-stream receiving buffer of display node 104 or any intermediate network devices such as switch 1102 (FIG. 11). An embodiment which includes a switch such as switch 1102 is described more completely below. Capture node 102 can possess information regarding the smallest buffer between capture node 102 and display node 104 in a number of ways. Display node 104 can be configured to report a receiving buffer size as part of capabilities 308 (FIG. 3). A minimum buffer size, e.g., 16 kilobytes (kB), can be specified as a prerequisite for any network device coupled between capture node 102 and display node 104. Thus, the minimum buffer size would be the lesser of the predetermined prerequisite buffer size, e.g., 16 kB, or the buffer size of display node 104. To form packets of the preferred size, audiovisual stream controller 206 collects enough of outgoing bit-stream 612 to fill the payload of a packet of the preferred size, aggregating small data records or dividing large data records as necessary, and includes the headers and CRCs described above.

To avoid overwhelming buffers at display node 104 or any intermediate network devices between capture node 102 and display node 104, audiovisual stream controller 206 meters transmission of the packets, i.e., limits the rate of transmission of the packets. Specifically, audiovisual stream controller 206 determines a time interval at which packets of outgoing bit-stream 612 are to be transmitted. To determine this time interval, audiovisual stream controller 206 divides the preferred packet size by the available bandwidth between capture node 102 and display node 104 to arrive at a packet interval.

As described above, the available bandwidth is a predetermined proportion of the connection speed in this illustrative embodiment. In addition, portions of the available bandwidth can be allocated to multiple audiovisual data streams, reducing further the amount of bandwidth allocated to outgoing bit-stream 612. For example, video from two separate capture nodes can be sent through switch 1102 to a single display node. Bandwidth allocated to each of the capture nodes is limited in that their sum must be within the total bandwidth available to the display node. Buffers within switch 1102 have a finite size and, if both capture nodes transmit at full bandwidth for even a brief burst, the buffers for data to be sent to the display node can be overwhelmed, resulting in loss of a portion of either or both video signals. Therefore, it is important that each capture node limits the rate of sending its video signal to avoid the possibility of exceeding, even momentarily, the available bandwidth to the display node.

In this example, for a given capture node, e.g., capture node 102, we have an available bandwidth of 0.6 gigabits (Gb) per second and a packet size of 4 kilobits (kb). Thus, the packet transmission interval is about 5.7 microseconds, during 4.0 microseconds of which capture node 102 can transmit data and during 1.7 microseconds of which capture node 102 waits. It is not necessary that the 4.0 microseconds of transmission or the 1.7 microseconds of waiting are contiguous. It is also not necessary that the respective periods are evenly distributed within the 5.7-microsecond packet transmission interval. What is important is that the ratio of transmission time to wait time of 4.0:1.7 is maintained within any 5.7-microsecond interval.

To meter the packets, audiovisual stream controller 206 initiates transmission of a 4 kb packet every 5.7 microseconds. In doing so, audiovisual stream controller 206 avoids exceeding the available bandwidth, even for short bursts which might overflow buffers in display node 104 or in intermediate network devices between capture node 102 and display node 104.

Figure 10:
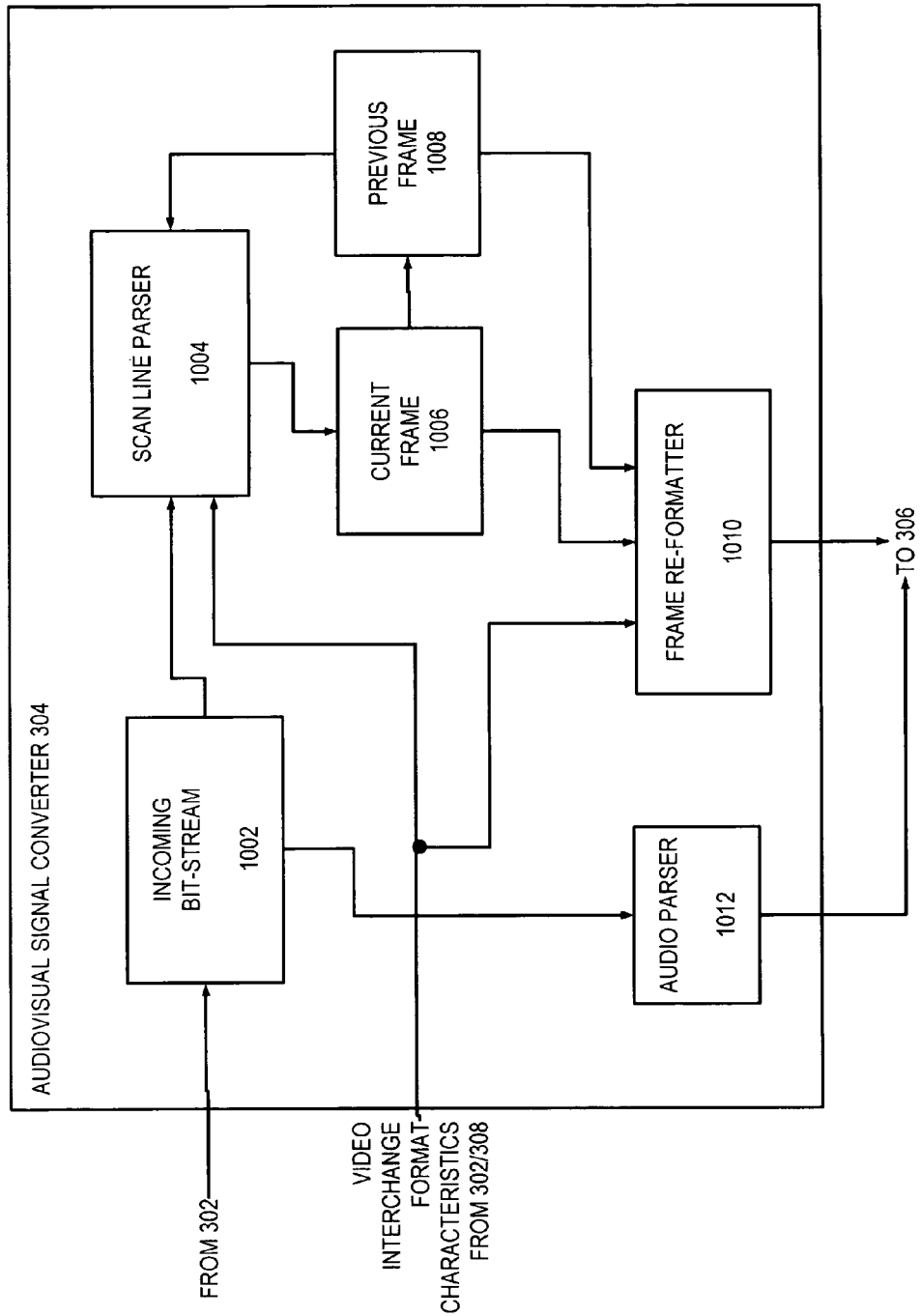
FIG. 10 is a block diagram of the audiovisual signal converter of FIG. 3 in greater detail.

The metered packets of audiovisual stream controller 206 form a packet stream 210 that is received by audiovisual stream controller 302 (FIG. 3). Audiovisual stream controller 302 checks for accuracy and completeness of the packetized data using the CRCs included by audiovisual stream controller 206 (FIG. 2) and reconstructs bit-stream 612 (FIG. 6) as incoming bit-stream 1002 (FIG. 10) and sends incoming bit-stream 1002 to audiovisual signal converter 304. Scan line parser 1004 of audiovisual signal converter 302 receives incoming bit-stream 1002 and reconstructs frames from incoming bit-stream 1002, storing the currently received frame as current frame 1006 and moving a previously received frame to previous frame 1008. Scan line parser 1004 reverses any compression and/or redundancy elimination performed by scan line packer 608 (FIG. 6). For example, in this illustrative embodiment scan line parser 1004 performs the reverse of any compression represented in data type field 906, and if data field 906 indicates no change in one or more scan lines, scan line parser 1004 re-uses those scan lines from previous frame 1008.

Once reconstructed by scan line parser 1004, current frame 1006 is re-formatted by frame re-formatter 1010. Specifically, frame re-formatter 1010 forms frames of the displayable interchange format from frames of the selected interchange format. Such can include changes in frame size, frame rate, color depth, etc. Frame re-formatter 1010, in increasing the frame rate from that of the video interchange format to that of the displayable format, can use current frame 1006 and previous frame 1008 for frame interpolation.

Frame re-formatter 1010 sends frames of the size, rate, color depth, etc. of the displayable interchange format to display logic 306 (FIG. 3), and display logic 306 adds the necessary blanking signals and timing characteristics to create the displayable format expected by display device 108.

Audio packets of incoming bit-stream 1002 are received by audio parser 1012 and audio parser 1012 sends the received audio to display logic 306 for inclusion in the displayable audiovisual format.

A particularly useful advantage of using data packets to move audiovisual signals from a video source to a display device is the availability of a digital switch, e.g., switch 1102 (FIG. 11), to route audiovisual signals from multiple video sources 106 and 106B-C to multiple display devices 108 and 108B. Packet switching is well-known and is not described in detail herein. Switches such as switch 1102 are capable of routing data packets from any of nodes 102, 102B-C, 104, and 104B to any other of nodes 102, 102B-C, 104, and 104B.

In the embodiment of FIG. 11, the data packets described above are merely addressed to the intended destination, e.g., display node 104. Such packets can also be addressed to both display nodes 104 and 104B, thereby enabling a one-to-many distribution of audiovisual signals. If the same interchange format can be used for both destinations, multicast delivery (a feature of many packet switches) can be used to send copies of the packets to multiple destinations. In FIG. 11, the audiovisual data stream from capture node 102 is displayed as main view 1108 of display device 108 and as picture-in-picture view 1110 of display device 108B. In this case, capture node 102 will send one high resolution video stream to display node 104 for display as a high resolution image on main view 1108. Capture node 102 also sends a down-scaled video stream to display node 104B for display as the small (low-resolution) picture-in-picture view 1110.

Packets from multiple source devices, e.g., through capture nodes 102 and 102C, can be addressed to a single destination through switch 1102, e.g., display node 104—thereby enabling picture-in-picture, partitioned (FIGS. 12 and 13), or any other simultaneous display of multiple audiovisual signals by display device 108, i.e., a many-to-one video distribution model. In the illustrative example of FIG. 1, main view 1108 of display device 108 displays the audiovisual data stream of capture node 102 from video source 106, and picture-in-picture view 1108C displays the audiovisual data stream of capture node 102C from video source 106C. The aggregation of those video streams onto one channel between switch 1102 and display node 104 happens within switch 1102 as a matter of routine data packet routing.

At the same time, either or both audiovisual signals from capture nodes 102 and 102B, for example, can be simultaneously routed to display node 104B for display by display device 108B—i.e., a many-to-many video distribution model. Main view 110B of display device 108B displays the audiovisual data stream received from capture node 102B, and picture-in-picture view 1110 displays the audiovisual data stream received from capture node 102. In short, each of display nodes 104 and 104B can receive any number or combination of audiovisual signals from capture nodes 102 and 102B-C, and each of capture nodes 102 and 102B-C can send an audiovisual signal to any number or combination of display devices 104 and 104B, limited only by the bandwidth of switch 1102. As gigabit/second data switches are becoming more available, such switches are becoming a viable medium for high-quality audio and video distribution and routing.

Figure 13:
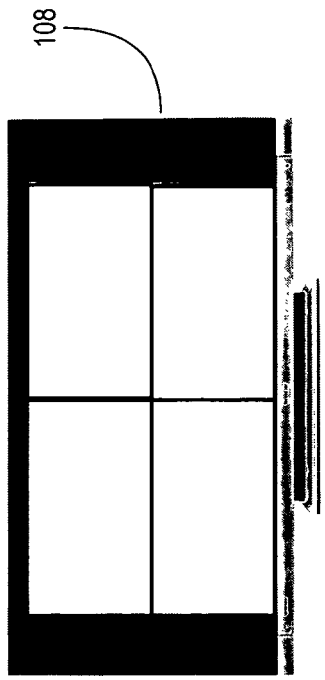
FIGS. 12 and 13 each show a display device with a partitioned screen which can display multiple video signals simultaneously.
Figure 12:
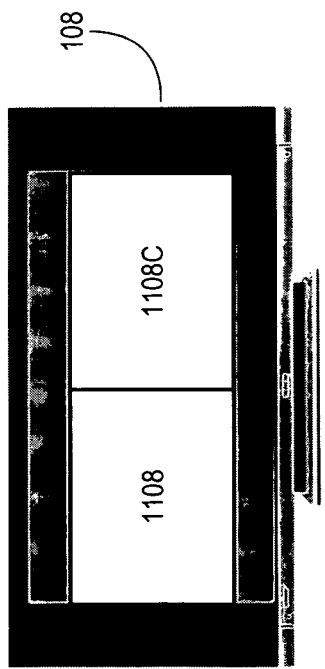

When receiving multiple audiovisual data streams, display node 104 limits bandwidth of each of the audiovisual data streams to preserve bandwidth for the others. In the example of FIG. 12, views 1108 and 1108C are shown in a side-by-side partitioned arrangement rather than the picture-in-picture arrangement of FIG. 11. In the example of FIG. 12, display node 104 limits the data rate of each of the incoming audiovisual data streams to one-half of the total available bandwidth through switch 1102. Suppose for purposes of illustration that switch 1102 has been empirically determined to support reliable delivery of data streams at 0.9 gigabits per second (Gb/s). The total amount of data that can be received by display node 104 through switch 1102 is therefore 0.9 Gb/s. Accordingly, display node 104 allocates 0.45 Gb/s to each of the incoming audiovisual data streams and reports that limitation to capture nodes 102 and 102C during negotiation of respective video interchange formats. FIG. 13 shows display device 108 with four (4) partitioned views with 16:9 aspect ratios as composed by display node 104. In the example of FIG. 13, display node 104 allocates one-quarter of the available bandwidth to each of four respective incoming audiovisual data streams.

In other embodiments, allocation of bandwidth is not evenly distributed among multiple audiovisual data streams. For example, one of the four audiovisual signals displayed by display device 108 in the example of FIG. 13 can be deemed to be more important than the other audiovisual signals and can be allocated a larger proportion of the available bandwidth between display node 104 and switch 1102 than the proportions allocated to other audiovisual signals. Similarly, lesser important audiovisual signals can be allocated a relatively small proportion of the available bandwidth. In the example of FIG. 13, one audiovisual signal can be allocated just enough bandwidth to show a few frames per second while another audiovisual signal can be allocated enough bandwidth for a full sixty frames per second.

In the picture-in-picture arrangement of FIG. 11, display node 104 uses only a small portion of the audiovisual data stream of capture node 102C for picture-in-picture view 1108C. Accordingly, display node 104 allocates only a small portion of the bandwidth to the audiovisual data stream of capture node 102C, e.g., 10%, with the remainder of the available bandwidth being allocated to the audiovisual data stream of capture node 102.

Bandwidth from a capture node, such as capture node 102, to switch 1102 is similarly limited. In the example of FIG. 11, the audiovisual signal sent by capture node 102 is addressed to both display node 104 and display node 104B. If capture node 102 can send the same audiovisual data stream to both display nodes 104 and 104B, capture node 102 can use the entirety of the bandwidth between capture node 102 and switch 1102 since conventional data switches can route a single data stream to multiple destinations. However, in some circumstances, capture node 102 cannot send the same audiovisual signal to multiple display nodes and multiple separate audiovisual signals are required of capture node 102.

To illustrate this point, it is helpful to consider a situation in which a capture node such as capture node 102 is asked for an HDTV-quality audiovisual signal and an SDTV-quality audiovisual signal from two respective display nodes. Consider further that the display node asking for the SDTV signal, e.g., display node 104B, has limited bandwidth for that signal—as if display device 108B is to display four (4) SDTV signals in a partitioned arrangement such as that shown in FIG. 13. To produce an HDTV-quality audiovisual signal, capture node 102 requires all or nearly all available bandwidth between capture node 102 and switch 1102. If display node 104B does not limit bandwidth for the signal to be received from capture node 102, capture node 102 can send a full-quality audiovisual signal to both display nodes 104 and 104B. However, since display node 104B has allocated only a quarter of the otherwise available bandwidth to the audiovisual signal of capture node 102, display node 104B cannot receive the full-quality audiovisual signal and still receive other audiovisual signals for other panes of the partitioned display.

Capture node 102 can handle such conflicting requests for various versions of its audiovisual signal in a number of ways. In one embodiment, capture node 102 satisfies all such requests, sending a single audiovisual signal of a particular interchange format to as many display nodes as possible to minimize the number of audiovisual streams produced. For the audiovisual streams produced, capture node 102 allocates a proportional share of the total available bandwidth to each audiovisual stream. As new streams are added and as individual streams are dropped, capture node 102 re-allocates bandwidth proportionally and a re-negotiation of interchange formats is invoked by capture node 102 by sending a signal so requesting.

In an alternative embodiment, capture node 102 simply refuses to produce any additional audiovisual stream when already producing one or more audiovisual streams which consume all available bandwidth between capture node 102 and switch 1102.

Another particularly useful advantage of using an agreed-upon interchange format is that the audiovisual signals processed in the system of FIG. 11 are heterogeneous. For example, in the example of FIG. 11, video source 106 produces an SDTV-format audiovisual signal, which is therefore the native format of video source 106 and capture node 102. Video source 106B produces a computer-generated digital video signal, e.g., SXGA, and an analog audio signal, the combination of which is therefore the native format of video source 106B and capture node 102B. And, video source 106C produces an HDTV-format audiovisual signal, which is therefore the native format of video source 106C and capture node 102C. Similarly, display devices 108 and 108B are different from one another. Display device 108 receives audiovisual content according to an HDTV format while display device 108B receives a computer-compatible video signal, e.g., XGA, and an analog audio signal for playback through embedded speakers. However, since all nodes communicate with one another according to a number of predetermined and mutually supported digital and packetized audiovisual signal formats, the heterogeneous nature of the respective native and displayable formats does not interfere with the effective cooperation between the nodes as described above.

The interaction of transaction flow diagram 400 (FIG. 4) accurately describes interaction in the embodiment shown in FIG. 11 with two significant exceptions. First, data packets are addressed to specific nodes for proper routing through switch 1102 as described above. Second, the mutual discovery of step 402 is more complex and includes selection of one or more available audiovisual signals. In the following description, capture nodes 102 and 102B-C are directly analogous to one another except where otherwise noted, and display nodes 104 and 104B are directly analogous to one another except where otherwise noted herein.

Display logic 306 (FIG. 3) of display node 104 implements an on-screen-display (OSD) graphical user interface (GUI) by which a human user can select one or more of capture nodes 102 and 102B-C. For example, display node 104 can be a set-top box or otherwise include a remote control by which the user can send signals to display node 104 to effect such user selections and uses display device 108 (FIG. 11) as a display medium with which GUI messages are displayed to the user. In addition, display node 104 can be integrated into display device 108 such that display node 104 leverages from other GUI features built into display device 108.

To present the user with a list of video sources from which to choose, display node 104 first discovers all capture nodes that are available for selection. Display node 104 discovers this by broadcasting a request for device information through switch 1102. Audiovisual stream controller 206 (FIG. 2) of capture node 102 is configured to respond to such requests for identification. In response to such requests, audiovisual stream controller 206 sends one or more data packets that collectively include data identifying capture node 102. Such data includes, for example, data specifying the manufacturer, model number, serial number, and firmware release number of capture node 102. To the extent capture node 102 is capable of discovering similar information about video source 106 and/or has stored such information, capture node 102 includes such similar information about video source 106. In one embodiment, the user is provided with a GUI mechanism for causing additional identification information, such as information regarding video source 106, to be sent from display node 104, through switch 1102, to capture node 102 for storage. Such additional information can include text specified by the user for assistance in later choosing video sources. For example, the user can direct that capture nodes 102 and 102B-C store the following respective descriptive texts: "video camera," "computer," and "digital satellite."

Audiovisual stream controllers 206 (FIG. 2) and 302 (FIG. 3) implement this discovery phase of interaction. Such discovery can comport with the known and available Simple Network Management Protocol (SNMP). Once display node 104 has determined relevant identification information regarding all capture nodes 102 and 102B-C, display node 104 presents such information on display device 108 for selection by the user.

With the respective descriptive texts, display node 104 is able to present a simple list of available video sources from which the user can choose. Many set top boxes come with user input controls, typically as buttons on a remote control, by which the user can issue user input commands such as up, down, left, right, and enter. With these controls available to the user, navigation of a list of available sources to select a source for viewing is straight-forward and intuitive for the user.

Such remote controls frequently have one or more buttons for initiating a picture-in-picture view. In response to a request by the user, e.g., using such buttons, to display picture-in-picture view 1108C, display node 104 presents the same list of available sources from which the user can select in the manner described above, e.g., using up, down, left, right, and enter buttons on the remote control of the set top box.

When multiple views are visible as shown in FIGS. 11-13, configuration by the user, e.g., to change which source supplies the video signal in a particular window, is divided into two steps: (i) select a window, e.g., either window 1108 (FIG. 12) or window 1108C, and (ii) select a source for the window in the manner described above.

Upon selection by the user, display node 104 and the selected capture node, e.g., capture node 102, commence to exchange data regarding the respective capabilities and native and displayable formats in the manner described above with respect to step 404 (FIG. 4). The remainder of the interaction is as described above in the context of FIG. 1 except that all data packets are addressed for proper routing though switch 1102 (FIG. 11) and that display node 104 maps pixel data from source coordinates to display coordinates and processes window overlaps in which pixels from one source obscure pixels from another source. Such mapping and obscuring are sometimes referred to as "compositing." Compositing is described more completely in the co-pending and commonly owned U.S. patent application Ser. No. 10/795,088 filed Mar. 4, 2004 by Eric Wogsberg and entitled "Compositing Multiple Full-Motion Video Streams for Display on a Video Monitor," and that application is incorporated herein in its entirety by reference.

Determination by capture node 102 of the selected interchange format can be somewhat different as well. In this embodiment in which capture node 102 can send the audiovisual data stream to multiple display nodes, capture node 102 can disregard the displayable interchange format since there may be multiple displayable interchange formats or can limit the video interchange format to the greatest effective use of fidelity of the native interchange format by all displayable interchange formats to which capture node 102 sends the audiovisual data stream. Limiting the video interchange format to the greatest effective use of fidelity of the native interchange format by all displayable interchange formats can require re-negotiation of the preferred interchange format if a new display node joins the collection of display nodes receiving the audiovisual data stream from capture node 102.

Another advantage of distributing heterogeneous audiovisual signals through a switch such as switch 1102 is the ability to attach additional components to provide additional functionality. For example, a timer 1104 is attached to a port of switch 1102 and provides a system-wide clock signal. In one embodiment, each of capture nodes 102 and 102B-C is configured to discover the presence of timer 1104 and to synchronize internal clocks with timer 1104 when timer 1104 is present. By synchronizing internal clocks of multiple capture nodes, display nodes are able to synchronize multiple audiovisual signals from multiple capture nodes by comparison of timestamps that are included in the audiovisual streams in the manner described above.

Another attached component is a digital signal processor 1106. Digital signal processor 1106 can perform such complex tasks as high-quality de-interlacing, edge detection, motion detection, and filtering such as sharpening, smoothing, and/or noise reduction on behalf of other nodes shown in FIG. 11. For illustration purposes, it is helpful to consider the example of an interlaced audiovisual signal captured by capture node 102 and a de-interlaced audiovisual signal expected by display node 104B. Consider also that capture node 102 produces only interlaced signals and display node 104 only accepts progressive scan signals. In determining a selected interchange format, capture node 102 and display node 104B determine that no commonly supported interchange formats exist. Rather than indicating a failure to reach agreement with respect to an interchange format, capture node 102—or, alternatively, display node 104B—can request de-interlacing service from digital signal processor 1106. Thus, digital signal processor 1106 can receive a video signal in one interchange format and send the video signal in a different interchange format. In addition, digital signal processor 1106 can receive and send the video signal in the same interchange format, processing the video signal content, e.g., by applying edge detection, motion detection, and filtering such sharpening, smoothing, and/or noise reduction to the video signal itself. Edge detection, motion detection, and filtering are known and are not described herein.

Digital signal processor 1106 performs such a service by acting as both (i) a display node receiving an interlaced audiovisual signal from capture node 102 and (ii) a capture node producing a de-interlaced audiovisual signal for display node 104B.

Timer 1104 and digital signal processor 1106 illustrate the modularity of the video distribution system described herein. Each capture node can be limited to supporting only one or a very few native formats of audiovisual signals and each display node can be limited to supporting only one or a very few displayable formats. Yet, these capture nodes and display nodes can be combined (i) to support a very wide variety of native and displayable formats, (ii) to convert each native format to any of the displayable formats, (iii) to send audiovisual signals from each source device to multiple display devices, (iv) to display multiple audiovisual signals on each display device, and (v) to add functionality by attaching additional nodes.

The network topologies described herein are particularly simple. FIG. 1 shows the simplest topology in which one capture node is connected by a single link to one display node. FIG. 11 shows multiple capture node and multiple display nodes interconnected by single links through a single switch. More complex topologies can be envisioned with multiple interconnected switches where each switch can have many capture and display nodes attached. These interconnected switches can be in the same room or can be separated by miles or thousand of miles to provide a truly global means for acquisition, distribution, and display of audiovisual signals.

In addition, for capture and display nodes needing greater bandwidth, a second or third link can be added to double or triple the amount of data that can be handled. For example, to double the bandwidth between switch 1102 (FIG. 11) and display node 104, two (2) 1.0-gigabit connections can couple switch 1102 and display node 104 to one another. Similarly, capture node 102C can be coupled to switch 1102 using two (2) 1.0-gigabit connections to effectively double the available bandwidth between capture node 102C and switch 1102.

The above description is illustrative only and is not limiting. Instead, the present invention is defined solely by the claims that follow and their full range of equivalents.

What is claimed is:

1. A video distribution system, the video distribution system comprising:
    a capture node comprising:
        capture logic for receiving a non-packetized video signal in a scanline-based native format;
        first signal format conversion logic, which is operatively coupled to the capture logic, for converting the video signal from the native format to a scanline-based interchange format by packetizing the video signal;
        first communication logic, which is operatively coupled to the first signal format conversion logic, for communicating with a display node and transporting the video signal in the interchange format; and
        negotiation logic, operatively coupled to the first signal format conversion logic;
    the display node comprising:
        second signal format conversion logic, which is operatively coupled to the first communication logic, for converting the video signal from the interchange format to a scanline-based displayable format;
        display driving logic, operatively coupled to the second signal format conversion logic, for sending the video signal in the displayable format to a display device such that the display device displays the video signal in the displayable format; and
        negotiation logic, operatively coupled to the second signal format conversion logic;
    wherein the negotiated logic of the capture node and the negotiation logic of the display node cooperatively select the interchange format.

2. The video distribution system of claim 1 wherein the capture node further comprises negotiation logic, operatively coupled to the first signal format conversion logic;
    further wherein the display node further comprises negotiation logic operatively coupled to the second signal format conversion logic;
    further wherein the negotiation logic of the capture node and the negotiation logic of the display node cooperatively select the interchange format according to video processing capabilities of the capture node.

3. The video distribution system of claim 1 wherein the capture node further comprises negotiation logic, operatively coupled to the first signal format conversion logic;
    further wherein the display node further comprises negotiation logic operatively coupled to the second signal format conversion logic;
    further wherein the negotiation logic of the capture node and the negotiation logic of the display node cooperatively select the interchange format according to video processing capabilities of the display node.

4. The video distribution system of claim 1 wherein the capture node further comprises negotiation logic, operatively coupled to the first signal format conversion logic;
    further wherein the display node further comprises negotiation logic operatively coupled to the second signal format conversion logic;
    further wherein the negotiation logic of the capture node and the negotiation logic of the display node cooperatively select the interchange format according to video processing capabilities of the display device.

5. The video distribution system of claim 1 wherein receiving comprises:
   receiving the video signal from an external video source.

6. The video distribution system of claim 1 wherein transporting comprises sending the video signal in the interchange format through a packet switch.

7. The video distribution system of claim 6 wherein sending comprises sending the video signal in the interchange format through two or more packet switches in parallel.

8. The video distribution system of claim 1 wherein the interchange format is a digital representation of scanlines in the native format.

9. The video distribution system of claim 1 wherein the interchange format includes digital packets capable of transport through a packet switch.

10. The video distribution system of claim 1 wherein the native format is different from the displayable format.

11. The video distribution system of claim 1 wherein converting the video signal from the native format to the interchange format comprises:
    dropping one or more frames of the video signal so as to result in a frame rate of the video signal in the interchange format that is less than a frame rate of the video signal in the native format.

12. The video distribution system of claim 1 wherein converting the video signal from the native format to the interchange format comprises:
    downscaling frames of the video signal so as to result in a frame size of the video signal in the interchange format that is less than a frame size of the video signal in the native format.

13. The video distribution system of claim 1 wherein converting the video signal from the native format to the interchange format comprises:
    changing color space representation of pixels of the video signal.

14. The video distribution system of claim 1 wherein converting the video signal from the native format to the interchange format comprises:
    interlacing frames of the video signal.

15. The video distribution system of claim 1 wherein converting the video signal from the native format to the interchange format comprises:
    de-interlacing frames of the video signal.

16. The video distribution system of claim 1 wherein converting the video signal from the interchange format to the displayable format comprises:
    adding one or more frames to the video signal so as to result in a frame rate of the video signal in the displayable format that is greater than a frame rate of the video signal in the interchange format.

17. The video distribution system of claim 1 wherein converting the video signal from the interchange format to the displayable format comprises:
    upscaling frames of the video signal so as to result in a frame size of the video signal in the displayable format that is greater than a frame size of the video signal in the interchange format.

18. The video distribution system of claim 1 wherein converting the video signal from the interchange format to the displayable format comprises:
    changing color space representation of pixels of the video signal.

19. The video distribution system of claim 1 wherein converting the video signal from the interchange format to the displayable format comprises:
    interlacing frames of the video signal.

20. The video distribution system of claim 1 wherein converting the video signal from the interchange format to the displayable format comprises:
    de-interlacing frames of the video signal.

21. The video distribution system of claim 1 wherein the receiving by the capture logic, the converting of the video signal from the native format to the interchange format by the first signal format conversion logic, the transporting by the communications logic, the converting of the video signal from the interchange format to the displayable format by the second signal format conversion logic, and the sending by the display driving logic are performed concurrently with one another.

22. The video distribution system of claim 21 wherein the receiving by the capture logic, the converting of the video signal from the native format to the interchange format by the first signal format conversion logic, the transporting by the communications logic, the converting of the video signal from the interchange format to the displayable format by the second signal format conversion logic, and the sending by the display driving logic are performed in real time.

23. The video distribution system of claim 1 further comprising negotiation logic, which is operatively coupled to the logic, that (i) receives data representing a plurality of predetermined interchange formats implemented by a remote one of the capture node and the display node; (ii) determines that one or more supported ones of the predetermined interchange formats are implemented a local one of the capture node and the display node; and (iii) selects one of the supported predetermined interchange formats as the interchange format.

24. The video distribution system of claim 23 wherein selecting comprises:
    considering an amount of loss of fidelity of at least one of the supported predetermined interchange formats relative to the native format;
    considering an amount of excess signal of at least one of the supported predetermined interchange formats relative to the displayable format; and
    considering an amount of signal bandwidth to or from remote node of one of the capture node and display node.

25. The video distribution system of claim 1 further comprising:
    negotiation logic, operatively coupled to the first signal format conversion logic, for selecting the interchange format according to an amount of available bandwidth to the display node.

26. The video distribution system of claim 25 wherein selecting comprises:
    determining a requisite bandwidth for the video signal in the interchange format; and
    comparing the requisite bandwidth to the amount of available bandwidth.

27. The video distribution system of claim 26 wherein the negotiation logic also determines that the requisite bandwidth exceeds the amount of available bandwidth.

28. The video distribution system of claim 27 wherein the negotiation logic also adapts the interchange format to reduce bandwidth required by the video signal in the interchange format.

29. The video distribution system of claim 28 wherein the negotiation logic adapts the interchange format by at least:
    configuring the interchange format to include a frame rate that is less than a frame rate of the native format such that converting comprises dropping one or more frames of the video signal.

30. The video distribution system of claim 28 wherein the negotiation logic adapts the interchange format by at least:

configuring the interchange format to include a color depth that is less than a color depth of the native format such that converting comprises reducing a color depth of the video signal.

31. The video distribution system of claim 28 wherein the negotiation logic adapts the interchange format by at least:
configuring the interchange format to include a color space that is different from a color space of the native format.

32. The video distribution system of claim 28 wherein the negotiation logic adapts the interchange format by at least:
configuring the interchange format to include a frame size that is less than a frame size of the native format such that converting comprises downscaling frames of the video signal.

33. The video distribution system of claim 28 wherein the first signal format conversion logic applies lossless compression techniques to the video signal.

34. The video distribution system of claim 28 wherein the first signal format conversion logic applies lossy compression techniques to the video signal.

35. The video distribution system of claim 1 wherein sending comprises:
determining a maximum data quantity;
determining a minimum time interval; and
sending no more than the maximum data quantity of the video signal during a time interval which is no shorter than the minimum time interval.

36. The video distribution system of claim 35 wherein the maximum data quantity is determined according to a minimum-sized buffer through which the video signal travels to the display node.

37. The video distribution system of claim 35 wherein the maximum data quantity is determined according to other traffic traveling through at least one buffer through which the video signal travels to the display node.

38. The video distribution system of claim 35 wherein the maximum data quantity and the minimum time interval are determined according to an amount of available bandwidth from the capture node to the display node.

39. The video distribution system of claim 1 further comprising:
a second display node comprising:
third signal format conversion logic, which is operatively coupled to the communications logic, for converting the video signal from the interchange format to a second scanline-based displayable format; and
second display driving logic, operatively coupled to the third signal format conversion logic, for sending the video signal in the second displayable format to a second display device such that the second display device displays the video signal in the second displayable format.

40. The video distribution system of claim 1 wherein the first signal format conversion logic converts the video signal from the native format to a second scanline-based interchange format; and
further wherein the communications logic transports the video signal in the second interchange format to a second remotely located display node such that the second display node converts the video signal from the second interchange format to a second scanline-based displayable format and causes display of the video signal in the second displayable format.

41. The video distribution system of claim 1 wherein converting comprises converting the video signal from the native format to two or more scanline-based interchange formats; and further wherein transporting comprises, for each of the two or more interchange formats, transporting the video signal in said each of the two or more interchange formats to one or more display nodes such that each of the one or more display nodes converts the video signal from said each of the two or more interchange formats to a respective scanline-based displayable format and causes display of the video signal in the respective displayable format.

42. The video distribution system of claim 1 further comprising:
a second capture node comprising:
second capture logic for receiving a second video signal in a second scanline-based native format; and
third signal format conversion logic, which is operatively coupled to the second capture logic and the communications logic, for converting the second video signal from the second native format to a second scanline-based interchange format;
wherein the communications logic transports the second video signal in the second interchange format from the second capture node to the display node while concurrently transporting the video signal in the first-mentioned interchange format from the capture node to the display node;
further wherein the second signal format conversion logic converts the second video signal from the second interchange format to the displayable format; and causes display of the second video signal in the displayable format.

43. The video distribution system of claim 42 wherein the display node further comprises user interface logic, operatively coupled to the communications logic, for providing a user interface for selecting the video signal and the second video signal from one or more available video signals.

44. The video distribution system of claim 42 wherein the display driving logic causes display of the video signal and the second video signal by at least:
compositing the video signal and the second video signal into composite video display.

45. The video distribution system of claim 44 wherein the composite video display combines the video signal and the second video signal in a picture-in-picture arrangement.

46. The video distribution system of claim 44 wherein the composite video display combines the video signal and the second video signal in a picture-beside-picture arrangement.

47. The video distribution system of claim 44 wherein the composite video display combines the video signal and the second video signal in a picture-over-picture arrangement.

48. The video distribution system of claim 1 wherein the interchange format includes timestamps associated with the video signal.

49. The video distribution system of claim 48 wherein the first signal format conversion logic inserts timestamps in an audio signal associated with the video signal wherein the timestamps that are inserted in the audio signal are related to the timestamps of the video signal.

50. The video distribution system of claim 49 wherein the display driving logic synchronizes playback of the video signal and the audio signal in accordance with the timestamps of both the video signal and the audio signals.

51. The video distribution system of claim 1 wherein the display node further comprises:
user interface logic, operatively coupled to the communications logic, for providing a user interface for selecting the video signal from one or more available video signals.

52. The video distribution system of claim 1 wherein transporting comprises:
   transporting the video signal in the interchange format through at least two separate communications channels to the display node.

53. A video distribution system for displaying a video signal, the video distribution system comprising:
   a capture node comprising:
      capture logic for receiving a non-packetized video signal in a scanline-based native format;
      first signal format conversion logic, which is operatively coupled to the capture logic, for converting the video signal from the native format to a first scanline-based interchange format by packetizing the video signal;
      first communication logic, which is operatively coupled to the first signal format conversion logic, for transporting the video signal in the first interchange format; and
      negotiation logic, operatively coupled to the first signal format conversion logic
   an intermediate node comprising:
      second signal format conversion logic, which is operatively coupled to the first communication logic, for converting the video signal from the first interchange format to a second scanline-based interchange format; and
   a display node comprising:
      second communication logic, which is operatively coupled to the second signal format conversion logic, for receiving the video signal in the second interchange format;
      third signal format conversion logic, which is operatively coupled to the second communications logic, for converting the video signal from the second interchange format to a scanline-based displayable format;
      display driving logic, operatively coupled to the third signal format conversion logic, for sending the video signal in the displayable format to a display device such that the display device displays the video signal in the displayable format;
      negotiation logic, operatively coupled to the third signal format conversion logic; and
   wherein the negotiated logic of the capture node and the negotiation logic of the display node cooperatively select the interchange format.

54. A method for displaying a video signal, the method comprising:
   receiving a non-packetized video signal in a scanline-based native format into a capture node;
   selecting cooperatively a scanline-based interchange format between the capture node and a display node;
   converting the video signal from the native format to the scanline-based interchange format by packetizing the video signal;
   transporting the video signal in the interchange format from the capture node to the display node;
   converting the video signal from the interchange format to a scanline-based displayable format; and
   sending the video signal in the displayable format to a display device that displays the video signal.

55. The method of claim 54 further comprising:
   selecting the interchange format according to video processing capabilities of the capture node.

56. The method of claim 54 further comprising:
   selecting the interchange format according to video processing capabilities of the display node.

57. The method of claim 54 further comprising:
   selecting the interchange format according to video processing capabilities of the display device.

58. The method of claim 54 wherein receiving comprises:
   receiving the video signal from an external video source.

59. The method of claim 54 wherein transporting comprises sending the video signal in the interchange format through a packet switch.

60. The method of claim 59 wherein sending comprises sending the video signal in the interchange format through two or more packet switches in parallel.

61. The method of claim 54 wherein the interchange format is a digital representation of scanlines in the native format.

62. The method of claim 54 wherein the interchange format includes digital packets capable of transport through a packet switch.

63. The method of claim 54 wherein the native format is different from the displayable format.

64. The method of claim 54 wherein converting the video signal from the native format to the interchange format comprises:
   dropping one or more frames of the video signal so as to result in a frame rate of the video signal in the interchange format that is less than a frame rate of the video signal in the native format.

65. The method of claim 54 wherein converting the video signal from the native format to the interchange format comprises:
   downscaling frames of the video signal so as to result in a frame size of the video signal in the interchange format that is less than a frame size of the video signal in the native format.

66. The method of claim 54 wherein converting the video signal from the native format to the interchange format comprises:
   changing color space representation of pixels of the video signal.

67. The method of claim 54 wherein converting the video signal from the native format to the interchange format comprises:
   interlacing frames of the video signal.

68. The method of claim 54 wherein converting the video signal from the native format to the interchange format comprises:
   de-interlacing frames of the video signal.

69. The method of claim 54 wherein converting the video signal from the interchange format to the displayable format comprises:
   adding one or more frames to the video signal so as to result in a frame rate of the video signal in the displayable format that is greater than a frame rate of the video signal in the interchange format.

70. The method of claim 54 wherein converting the video signal from the interchange format to the displayable format comprises:
   upscaling frames of the video signal so as to result in a frame size of the video signal in the displayable format that is greater than a frame size of the video signal in the interchange format.

71. The method of claim 54 wherein converting the video signal from the interchange format to the displayable format comprises:
   changing color space representation of pixels of the video signal.

72. The method of claim 54 wherein converting the video signal from the interchange format to the displayable format comprises:
interlacing frames of the video signal.

73. The method of claim 54 wherein converting the video signal from the interchange format to the displayable format comprises:
de-interlacing frames of the video signal.

74. The method of claim 54 wherein the receiving, the converting of the video signal from the native format to the interchange format, the transporting, the converting of the video signal from the interchange format to the displayable format, and the displaying are performed concurrently with one another.

75. The method of claim 74 wherein the receiving, the converting of the video signal from the native format to the interchange format, the transporting, the converting of the video signal from the interchange format to the displayable format, and the displaying are performed in real time.

76. The method of claim 54 further comprising:
receiving data representing a plurality of predetermined scanline-based interchange formats implemented by a remote one of the capture and display nodes;
determining that one or more supported ones of the predetermined interchange formats are implemented a local one of the capture node and the display node; and
selecting one of the supported predetermined interchange formats as the interchange format.

77. The method of claim 76 wherein selecting comprises:
considering an amount of loss of fidelity of at least one of the supported predetermined interchange formats relative to the native format;
considering an amount of excess signal of at least one of the predetermined supported interchange formats relative to the displayable format; and
considering an amount of signal bandwidth to or from the remote node of the capture and display nodes.

78. The method of claim 54 further comprising:
selecting the interchange format according to an amount of available bandwidth to the display node.

79. The method of claim 78 wherein selecting comprises:
determining a requisite bandwidth for the video signal in the interchange format; and
comparing the requisite bandwidth to the amount of available bandwidth.

80. The method of claim 79 further comprising:
determining that the requisite bandwidth exceeds the amount of available bandwidth.

81. The method of claim 80 further comprising:
adapting the interchange format to reduce bandwidth required by the video signal in the interchange format.

82. The method of claim 81 wherein adapting comprises:
configuring the interchange format to include a frame rate that is less than a frame rate of the native format such that converting comprises dropping one or more frames of the video signal.

83. The method of claim 81 wherein adapting comprises:
configuring the interchange format to include a color depth that is less than a color depth of the native format such that converting comprises reducing a color depth of the video signal.

84. The method of claim 81 wherein adapting comprises:
configuring the interchange format to include a color space that is different from a color space of the native format.

85. The method of claim 81 wherein adapting comprises:
configuring the interchange format to include a frame size that is less than a frame size of the native format such that converting comprises downscaling frames of the video signal.

86. The method of claim 81 wherein converting comprises:
applying lossless compression techniques to the video signal.

87. The method of claim 81 wherein converting comprises:
applying lossy compression techniques to the video signal.

88. The method of claim 54 wherein sending comprises:
determining a maximum data quantity;
determining a minimum time interval; and
sending no more than the maximum data quantity of the video signal during a time interval which is no shorter than the minimum time interval.

89. The method of claim 88 wherein the maximum data quantity is determined according to a minimum-sized buffer through which the video signal travels to the display node.

90. The method of claim 88 wherein the maximum data quantity is determined according to other traffic traveling through at least one buffer through which the video signal travels to the display node.

91. The method of claim 88 wherein the maximum data quantity and the minimum time interval are determined according to an amount of available bandwidth from the capture node to the display node.

92. The method of claim 54 further comprising:
sending the video signal in the interchange format to a second remotely located display node such that the second remotely located display node converts the video signal from the interchange format to a second scanline-based displayable format and causes display of the video signal in the second displayed format.

93. The method of claim 54 further comprising:
converting the video signal from the native format to a scanline-based second interchange format; and
sending the video signal in the second interchange format to a second remotely located display node such that the second display node converts the video signal from the second interchange format to a second scanline-based displayable format and causes display of the video signal in the second displayable format.

94. The method of claim 54 wherein converting comprises converting the video signal from the native format to two or more interchange formats; and
further wherein sending comprises, for each of the two or more interchange formats, sending the video signal in each of the two or more scanline-based interchange formats to one or more display nodes such that each of the one or more display nodes converts the video signal from the interchange format to a respective scanline-based displayable format and causes display of the video signal in the respective displayable format.

95. The method of claim 54 further comprising:
concurrently with the receiving of the video signal in the first-mentioned interchange format, receiving a second video signal in a second scanline-based interchange format to which the second video signal has been converted from a second scanline-based native format by a second remotely located capture node;
converting the second video signal from the second interchange format to the displayable format; and
displaying the second video signal in the displayable format.

96. The method of claim 95 further comprising:
providing a user interface for selecting the video signal and the second video signal from one or more available video signals.

97. The method of claim 95 wherein displaying the video signal and displaying the second video signal comprises:
compositing the video signal and the second video signal into composite video display.

98. The method of claim 97 wherein the composite video display combines the video signal and the second video signal in a picture-in-picture arrangement.

99. The method of claim 97 wherein the composite video display combines the video signal and the second video signal in a picture-beside-picture arrangement.

100. The method of claim 97 wherein the composite video display combines the video signal and the second video signal in a picture-over-picture arrangement.

101. The method of claim 54 wherein the interchange format includes timestamps associated with the video signal.

102. The method of claim 101 further comprising inserting timestamps in an audio signal associated with the video signal wherein the timestamps that are inserted in the audio signal are related to the timestamps of the video signal.

103. The method of claim 102 wherein displaying comprises:
synchronizing playback of the video signal and the audio signal in accordance with the timestamps of both the video signal and the audio signal.

104. The method of claim 54 further comprising:
providing a user interface for selecting the video signal from one or more available video signals.

105. The method of claim 54 wherein transporting comprises:
transporting the video signal in the interchange format through at least two separate communications channels to the display node.

106. A method for displaying a video signal, the method comprising:
receiving a non-packetized video signal in a scanline-based native format into a capture node;
converting the video signal from the native format to a first scanline-based interchange format by packetizing the video signal;
transporting the video signal in the first interchange format from the capture node to an intermediate signal processing node;
converting the video signal from the first interchange format to a second scanline-based interchange format;
transporting the video signal in the second interchange format from the intermediate signal processing node to a display node;
converting the video signal from the second interchange format to a scanline-based displayable format; and
sending the video signal in the displayable format to a display device such that the display device displays the video signal in the displayable format;
wherein further said interchange format is cooperatively selected by said capture node and said display node.

* * * * *